US010901215B1

(12) United States Patent
Newcombe et al.

(10) Patent No.: US 10,901,215 B1
(45) Date of Patent: Jan. 26, 2021

(54) SYSTEMS AND METHODS FOR PROVIDING A MOBILE ARTIFICIAL REALITY USER WITH ENVIRONMENTAL AWARENESS

(71) Applicant: Oculus VR, LLC, Menlo Park, CA (US)

(72) Inventors: Richard Newcombe, Seattle, WA (US); Simon Gareth Green, Deptford (GB); Steven John Lovegrove, Woodinville, WA (US); Renzo De Nardi, Seattle, WA (US); Yuheng Ren, Newcastle, WA (US); Thomas John Whelan, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/981,141

(22) Filed: May 16, 2018

(51) Int. Cl.
*G02B 27/01* (2006.01)
*G06T 7/70* (2017.01)
*G06T 19/00* (2011.01)
*G06T 15/00* (2011.01)

(52) U.S. Cl.
CPC ............ *G02B 27/0172* (2013.01); *G06T 7/70* (2017.01); *G06T 15/005* (2013.01); *G06T 19/006* (2013.01); *G06T 2207/10028* (2013.01); *G06T 2215/16* (2013.01)

(58) Field of Classification Search
CPC ..... G02B 27/0172; G06T 15/005; G06T 7/70; G06T 19/006; G06T 2207/10028; G06T 2215/16
See application file for complete search history.

(56) References Cited

U.S. PATENT DOCUMENTS

| 2016/0171771 | A1* | 6/2016 | Pedrotti | G02B 27/017 345/633 |
|---|---|---|---|---|
| 2016/0350973 | A1* | 12/2016 | Shapira | G06T 19/006 |
| 2017/0205892 | A1* | 7/2017 | Petrovskaya | G06T 17/20 |
| 2018/0276891 | A1* | 9/2018 | Craner | G06T 19/003 |

* cited by examiner

*Primary Examiner* — Sahlu Okebato
(74) *Attorney, Agent, or Firm* — FisherBroyles, LLP

(57) ABSTRACT

The disclosed computer-implemented method may include comprising identifying, within a real-world environment, a position of a user relative to a safety boundary. The position of the user is identified by a head-mounted display system comprising a display device. The display device is configured to at least partially obscure visibility of the real-world environment to the user. The method may further include selecting, based on the position of the user, at least a portion of a model of the real-world environment, rendering the portion of the model of the real-world environment, and displaying the rendered portion of the model of the real-world environment via the display device as a notification of the position of the user relative to the safety boundary. Various other methods, systems, and computer-readable media are also disclosed.

20 Claims, 26 Drawing Sheets

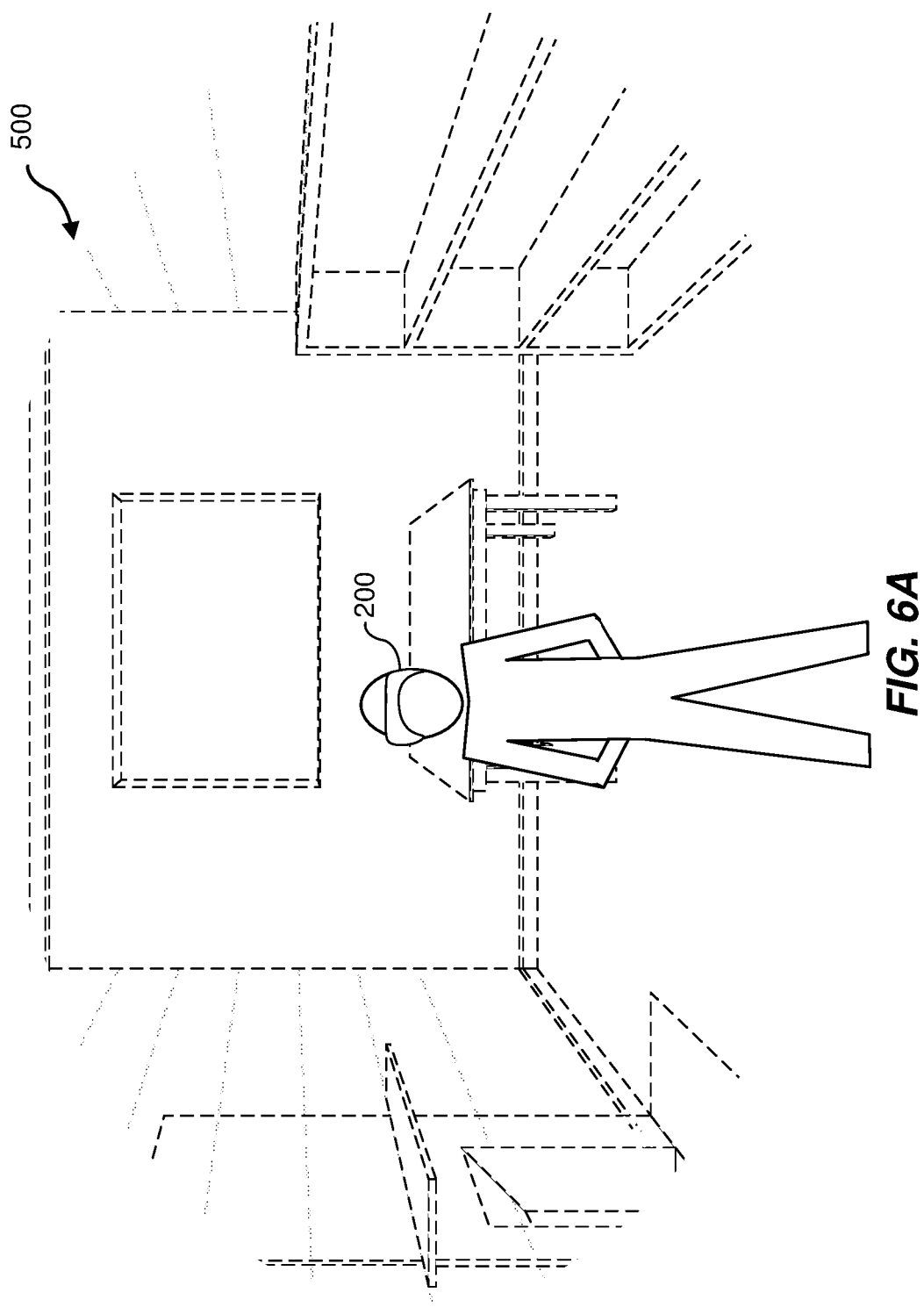

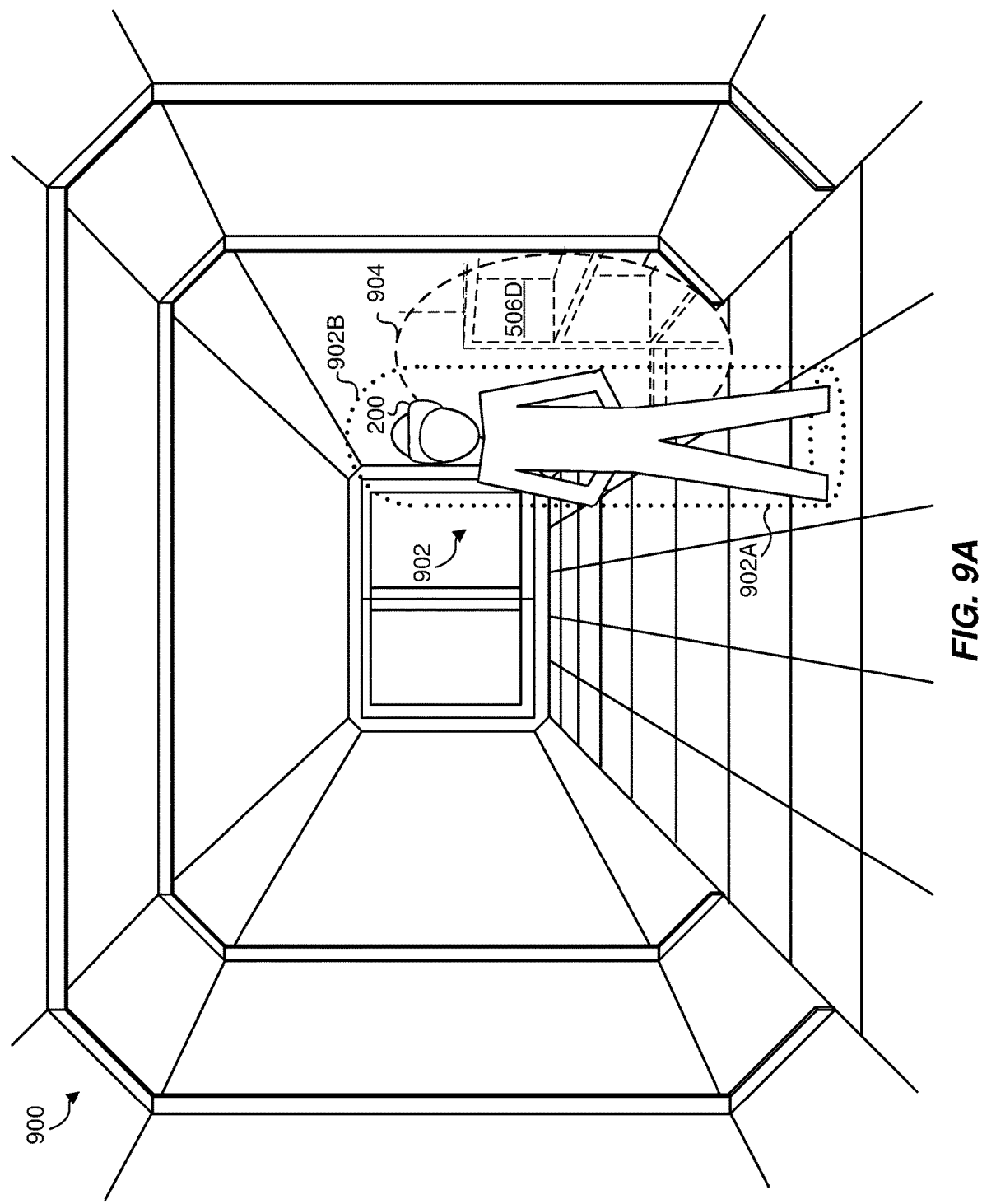

SYSTEMS AND METHODS FOR PROVIDING A MOBILE ARTIFICIAL REALITY USER WITH ENVIRONMENTAL AWARENESS

BACKGROUND

Virtual reality (VR) systems and augmented reality (AR) systems may enable users to have more immersive experiences than ordinary television or video gaming can provide. While wearing a head-mounted display (HMD), a user can view different portions of a captured scene or an artificially generated scene simply by orienting his or her head, just as the user naturally does to view a real-world environment. The scene may be presented in the HMD to the user based on the position and orientation of the user's head, such that the scene changes based on changes in the position and orientation of the user's head. A mobile VR system can also account for the movement of the user as the user walks around in the real-world environment, such that the user perceives him or herself to be moving in a virtual environment.

Although immersive, these features may permit the user to engage with the virtual environment in a way that causes the user to forget important aspects of the user's real-world environment. For example, a user trying to walk from one position in a virtual environment to another position may fail to account for (or be unable to see) a real-world obstacle, such as a table, a couch, or a wall due to the user's lack of awareness of the real-world environment. This may result in a collision with the real-world environment or a feature in the real-world environment.

SUMMARY

As will be described in greater detail below, the instant disclosure describes systems and methods that may enable a user, wearing an HMD device, to be made aware of his or her environment to prevent collisions with features or obstacles in the real-world environment.

In one example, a method for accomplishing the above-described task may include identifying, within a real-world environment, a position of a user relative to a safety boundary. The position of the user may be identified by a head-mounted display (HMD) system including a display device that may be configured to at least partially obscure visibility of the real-world environment to the user. The method may also include selecting, based on the position of the user, at least a portion of a model of the real-world environment, rendering the portion of the model of the real-world environment, and displaying the rendered portion of the model of the real-world environment via the display device as a notification of the position of the user relative to the safety boundary.

In some implementations, at least a portion of the safety boundary may include at least a portion of the model of the real-world environment. The method may include rendering the portion of model of the real-world environment by rendering the portion of the model of the real-world environment based on a visual appearance of the real-world environment. Rendering the portion of the model of the real-world environment may include capturing an image of the real-world environment, extracting an aspect of the visual appearance of a physical surface represented in the captured image, and applying the aspect to a modeled surface, corresponding to the physical surface, included in the model of the real-world environment. In this way, the modeled surface may be rendered with the aspect of the visual appearance of the physical surface. The method may further include generating an environment identifier from information captured from the real-world environment, comparing the environment identifier with a plurality of stored environment identifiers to find a matching environment identifier, and retrieving the matching model for rendering and display in the display device when the comparison results in finding the matching environment identifier. The matching environment identifier may be associated with a matching model of a plurality of models of a model library and a matching visual appearance data set of a plurality of visual appearance data sets. The method may also include generating a new model when the comparison results in not finding the matching environment identifier.

In some implementations, the method may further include collecting, with a depth-sensing system, depth information associated with physical surfaces within the real-world environment and generating the model of the real-world environment based on the collected depth information. Identifying the position of the user relative to the safety boundary may include determining that the user is moving toward the safety boundary. Displaying the rendered portion of the model of the real-world environment may be performed in response to the determining that the user is moving toward the safety boundary. The method may further include capturing real-time depth data within the real-world environment, identifying a physical object, in the real-time depth data, that is positioned within the real-world environment, generating a representation of the identified physical object, rendering the representation of the identified physical object, and displaying the rendered representation of the identified physical object based on the position of the user. The model may include representations of physical surfaces present within the real-world environment during a training phase. The method may further include identifying, during an interaction phase and within the real-world environment, a new physical surface that is not represented in the model. In response to at least one of identifying the new physical surface or identifying the position of the user, the method may include displaying a representation of the new physical surface as an indication that the new physical surface is present in the real-world environment. The method may further include rendering the representation of the new physical surface with a lower-resolution texture than is applied to the representations of physical surfaces present within the real-world environment during the training phase.

In some implementations, the method may further include detecting that the position of the user is within a threshold distance of a physical object present in the real-world environment, and in response to the detecting that the position of the user is within the threshold distance of the physical object, directing that a rendering of a representation of the physical object be displayed to the user via the display device. Identifying the position of the user relative to the safety boundary may include determining a location and orientation of the display device relative to the real-world environment. The method may also include defining a personal zone of the user. The personal zone may surround the location of the display device and extend downward to approximate physical dimensions of the user within the real-world environment. The method may also include identifying the position of the personal zone relative to the safety boundary.

In one example, an HMD system may include an HMD device dimensioned to be secured to a head of a user in a manner that at least partially obscures visibility of a real-world environment to the user. The HMD system may also include a positioning subsystem that detects a position of the user within the real-world environment relative to a safety boundary and a processing subsystem. The processing subsystem may select, based on the position of the user relative to the safety boundary, at least a portion of a model of the real-world environment, render the portion of the model of the real-world environment, and direct the display device to display the rendered portion of the model of the real-world environment to the user as a notification of the position of the user relative to the safety boundary.

In some implementations, the positioning subsystem may include a localization and modeling system that performs generation of the model of the real-world environment, generation of the safety boundary relative to the model of the real-world environment, and determination of the position of the user relative to the real-world environment and relative to the safety boundary. The display device may be configured to fully obscure visibility of the real-world environment to the user. The HMD system may further include a hand-secured controller. The positioning subsystem may detect the position of the user by determining a position of the hand-secured controller. The processing subsystem may select, based on the position of the hand-secured controller relative to the safety boundary, at least the portion of the model of the real-world environment and may direct the display device to display the rendered portion of the model of the real-world environment to the user as a notification of the position of the hand-secured controller relative to the safety boundary.

In some examples, the above-described method may be encoded as computer-readable instructions on a computer-readable storage medium. For example, a computer-readable storage medium may include one or more computer-executable instructions that, when executed by at least one processor of a computing device, may cause the computing device to (1) identify, within a real-world environment, a position of a user relative to a safety boundary, (2) select, based on the position of the user, at least a portion of a model of the real-world environment, (3) render the portion of the model of the real-world environment, and (4) display the rendered portion of the model of the real-world environment via a display device as a notification of the position of the user relative to the safety boundary.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 5A, 6A, and 7A present perspective views of a user wearing the HMD device of FIG. 2 to generate a model of a real-world environment, according to some embodiments.

FIGS. 9A, 10A, and 11A present perspective views of a user wearing the HMD device of FIG. 2 interacting with a virtual environment and the generated model of the real-world environment, according to some embodiments.

Figure 1:
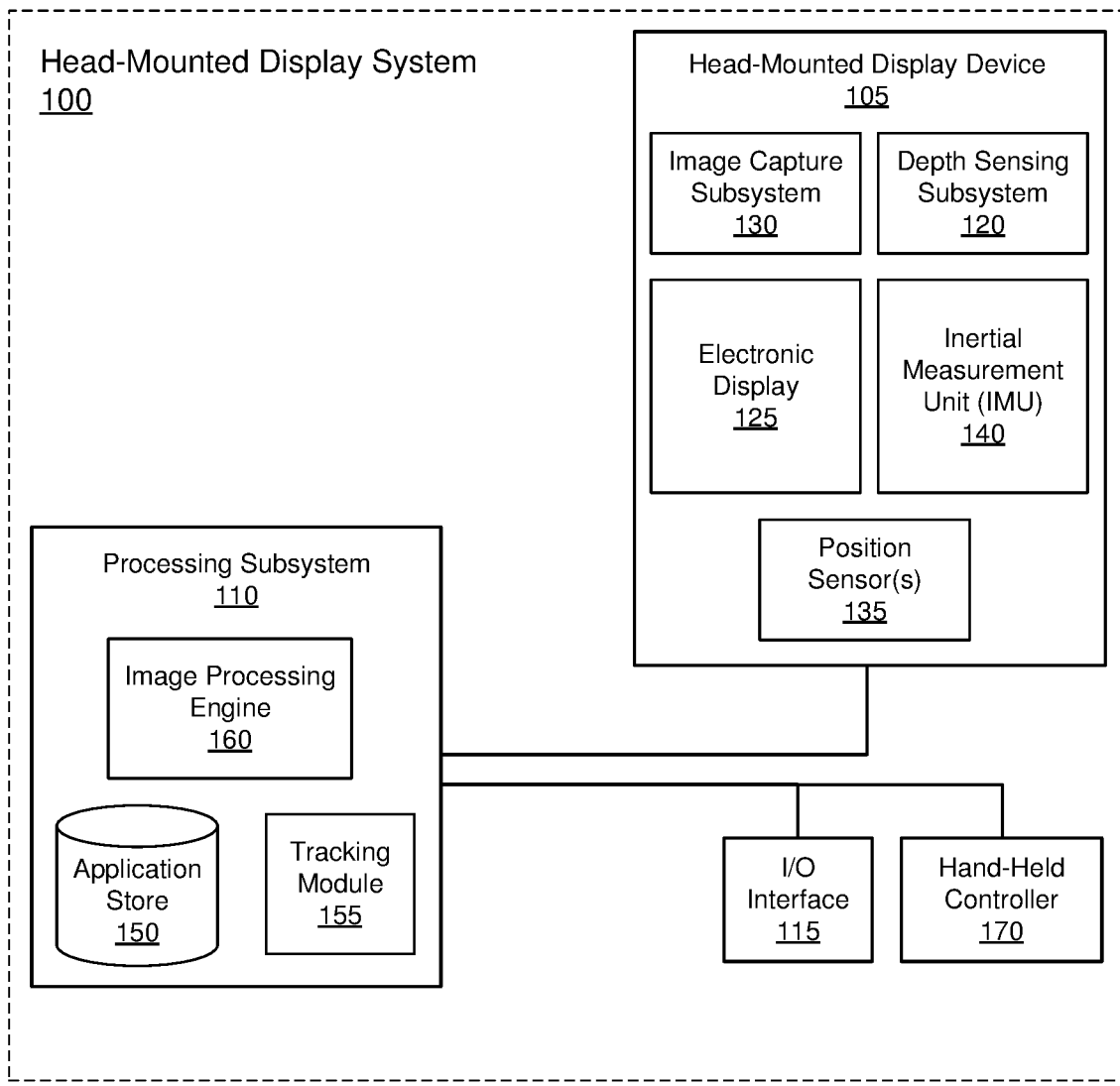
FIG. 1 is a block diagram of an exemplary head-mounted display (HMD) system, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and method that present a reconstructed model of an HMD device user's real-world surroundings or environment to that user when the user approaches a feature of the real-world environment. Because an HMD device may partially or completely obstruct the user's view of the real-world environment, the user may be able to see only a portion of his or her surrounds at most, and many HMD devices may entirely obstruct the user's view. As part of a training phase, the user may first be prompted to visualize the real-world environment with the HMD device, which can generate a model of that environment. During an interaction phase, the user may interact with a virtual environment, such that the movement of a user from one location to another in the virtual environment is accomplished by the user moving (e.g., walking around) within the real-world environment. For example, the user may walk from one part of his or her living room to another to "move" within the virtual environment being presented in a display of the HMD device the user is wearing. To provide the user with awareness of the real-world environment during the interaction phase, a portion of the model generated during the training phase may be shown to the user in a display along with the virtual scene or environment when the user moves too close to a feature of the real-world environment.

The portion of the model shown to the user may depend on many factors. The portion shown may correspond to the portion of the real-world environment that the user would see if the user's view were not obstructed by the HMD device, such that the experience is similar to "looking through" the HMD device. Accordingly, the portion of the model presented to the user may be presented as rendered from the point of view of the user. The model portion may be presented in a window that may include or omit a visual border that highlights or clearly defines where the rendered model begins and ends relative to the rendered virtual environment the user is engaging with. The size and shape of the window may change depending on how close the user is to a safety boundary defined relative to the features of the real-world environment and/or on how quickly the user is approaching the safety boundary or the features. For example, when the user reaches a threshold distance from the safety boundary the user is approaching, a "window" may be rendered in the HMD device that shows the model of the real-world environment. As the user gets closer to the safety boundary, the size of the window showing the model of the real-world environment may increase.

In order to more clearly communicate the user's position relative to the real-world environment, the model may be rendered based on the visual appearance of the real-world environment. For example, a model of a red couch in the real-world environment may be rendered with the same or similar red color. A model of a table having a striped table cloth may be rendered as having the same striped pattern or a similar striped pattern when shown to the user in a window. In this way, the user may more easily recognize that it is his or her real-world environment being presented in the window and more intuitively be made aware of his or her position within the real-world environment.

To simplify the use of a VR system that includes such safety features, the model may be stored in a memory device for use in future VR sessions. For example, the first time the HMD device is used in a room, the system may prompt the user to scan or fully view the real-world environment with the HMD device as part of a training phase. The system may generate the model and then save the model in a memory device. The second time (and any additional subsequent times) the HMD device is used in the same room, the HMD device may obtain some information from the room that can be used an identifier of that room. The system may use the identifying information to query a database to determine whether a previously saved model is included in memory. If a matching model is found, the model may be loaded for user by the VR system without requiring a new model to be produced every time the HMD device is to be used.

The following will provide, with reference to FIGS. 1-15, detailed descriptions of systems and methods that permit generation of a recognizable model of the user's real-world environment and provide for a display of a select portion of the model in the electronic display of a worn HMD device to help the user avoid an accidental collision.

FIG. 1 is a block diagram of one embodiment of an HMD system 100 that presents scenes (e.g., captured scenes, artificially-generated scenes, or a combination of the same) to a user. The HMD system 100 may operate in a virtual reality (VR) system environment, an augmented reality (AR) system environment, a mixed reality (MR) system environment, or some combination thereof. The HMD system 100 shown in FIG. 1 may include an HMD device 105 that includes or communicates with a processing subsystem 110 and an input/output (I/O) interface 115. The HMD device 105 may completely obstruct the user's view of the real-world environment, in some embodiments. Other embodiments may only partially obstruct the user's view of the real-world environment and/or may obstruct the user's view depending on content being displayed in a display of the HMD device 105.

While FIG. 1 shows an exemplary HMD system 100 that includes at least one HMD device 105 and at least one I/O interface 115, in other embodiments any number of these components may be included in the HMD system 100. For example, there may be multiple HMDs 105, each having an associated I/O interface 115, with each HMD device 105 and I/O interface 115 communicating with the processing subsystem 110. In embodiments in which the processing subsystem 110 is not included within or integrated with the HMD device 105, the HMD device 105 may communicate with the processing subsystem 110 over a wired connection or a wireless connection. In alternative configurations, different and/or additional components may be included in the HMD system 100. Additionally, functionality described in connection with one or more of the components shown in FIG. 1 may be distributed among the components in a different manner than described with respect to FIG. 1, in some embodiments.

The HMD device 105 may present a variety of content to a user, including virtual views of an artificially rendered virtual-world environment and/or augmented views of a physical, real-world environment. Augmented views may be augmented with computer-generated elements (e.g., two-dimensional (2D) or three-dimensional (3D) images, 2D or 3D video, sound, etc.). In some embodiments, the presented content may include audio that is presented via an internal or external device (e.g., speakers and/or headphones) that receives audio information from the HMD device 105, the processing subsystem 110, or both, and presents audio data based on the audio information. In some embodiments, such speakers and/or headphones may be integrated into or releasably coupled or attached to the HMD device 105. The HMD device 105 may include one or more bodies, which may be rigidly or non-rigidly coupled together. A rigid coupling between rigid bodies may cause the coupled rigid bodies to act as a single rigid entity. In contrast, a non-rigid coupling between rigid bodies may allow the rigid bodies to move relative to each other. An embodiment of the HMD device 105 is the HMD device 200 shown in FIG. 2 and described in further detail below.

In some examples, the HMD device 105 may include a depth-sensing subsystem 120 (or depth camera system), an electronic display 125, an image capture subsystem 130 that includes one or more cameras, one or more position sensors 135, and/or an inertial measurement unit (IMU) 140. One or more of these components may provide a positioning subsystem of the HMD device 105 that can determine the position of the HMD device 105 relative to a real-world environment and individual features contained therein. Other embodiments of the HMD device 105 may include an optional eye-tracking or gaze-estimation system configured to track the eyes of a user of the HMD device 105 to estimate the user's gaze. Some embodiments of the HMD device 105 may have different components than those described in conjunction with FIG. 1.

The depth-sensing subsystem 120 may capture data describing depth information characterizing a local real-world area or environment surrounding some or all of the HMD device 105. In some embodiments, depth-sensing subsystem 120 may characterize a position or velocity of the depth-sensing subsystem 120 (and thereby of the HMD device 105) within the local area. The depth-sensing subsystem 120 can compute a depth map using collected data (e.g., based on a captured light according to one or more computer-vision schemes or algorithms, by processing a portion of a structured light pattern, by time-of-flight (ToF) imaging, simultaneous localization and mapping (SLAM), etc.) or the depth-sensing subsystem 120 can transmit this data to another device, such as an external implementation of the processing subsystem 110, that can generate a depth map using the data from the depth-sensing subsystem 120. As described herein, the depth maps may be used to generate a model of the environment surrounding the HMD device 105. Accordingly, the depth-sensing subsystem 120 may be referred to as a localization and modeling subsystem or may be a part of such a subsystem.

The electronic display 125 may display two-dimensional or three-dimensional images to the user in accordance with data received from the processing subsystem 110. In various embodiments, the electronic display 125 may include a single electronic display or multiple electronic displays (e.g., a display for each eye of a user). Examples of the electronic display 125 may include a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, another suitable display, or some combination thereof. The electronic display 125 may be opaque such that the user cannot see the local environment through the electronic display 125. When the user cannot see his or her local environment, the user may lose track of potential hazards in that environment.

The image capture subsystem 130 may include one or more optical image sensors or cameras that capture and collect image data from the local environment. In some embodiments, the sensors included in the image capture subsystem 130 may provide stereoscopic views of the local environment that may be used by the processing subsystem 110 to generate image data that characterizes the local environment and/or a position and orientation of the HMD device 105 within the local environment. In some embodiments, the image data may be processed by the processing subsystem 110 or another component of the image capture subsystem 130 to generate a three-dimensional model of the local environment. For example, the image capture subsystem 130 may include simultaneous localization and mapping (SLAM) cameras or other cameras that include a wide-angle lens system that captures a wider field-of-view than may be captured by the eyes of the user.

In some embodiments, the processing subsystem 110 may process the images captured by the image capture subsystem 130 to extract various aspects of the visual appearance of the local real-world environment. For example, the image capture subsystem 130 may capture color images of the real-world environment that provide information regarding the visual appearance of various features within the real-world environment. The image capture subsystem 130 may capture the color, patterns, etc. of the walls, the floor, the ceiling, paintings, pictures, fabric textures, etc., in the room. These visual aspects may be encoded and stored in a database. The processing subsystem 110 may associate these aspects of visual appearance with specific portions of the model of the real-world environment so that the model can be rendered with the same or similar visual appearance at a later time.

The IMU 140 may, in some examples, represent an electronic subsystem that generates data indicating a position and/or orientation of the HMD device 105 based on measurement signals received from one or more of the position sensors 135 and from depth information received from the depth-sensing subsystem 120 and/or the image capture subsystem 130. For example, the position sensors 135 may generate one or more measurement signals in response to motion of the HMD device 105. Examples of position sensors 135 include one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more of the position sensors 135, the IMU 140 may generate data indicating an estimated current position, elevation, and/or orientation of the HMD device 105 relative to an initial position and/or orientation of the HMD device 105. This information may be used to generate a personal zone that can be used as a proxy for the user's position within the local environment. For example, the position sensors 135 may include multiple accelerometers to measure translational motion (forward/back, up/down, left/right) and multiple gyroscopes to measure rotational motion (e.g., pitch, yaw, roll). As described herein, the image capture subsystem 130 and/or the depth-sensing subsystem 120 may generate data indicating an estimated current position and/or orientation of the HMD device 105 relative to the real-world environment in which the HMD device 105 is used.

The I/O interface 115 may represent a subsystem or device that allows a user to send action requests and receive responses from the processing subsystem 110 and/or a hand-secured or hand-held controller 170. In some embodiments, the I/O interface 115 may facilitate communication with more than one hand-held controller 170. For example, the user may have two hand-held controllers 170, with one in each hand. An action request may, in some examples, represent a request to perform a particular action. For example, an action request may be an instruction to start or end capture of image or video data, an instruction to perform a particular action within an application, or an instruction to start or end a boundary definition state. The I/O interface 115 may include one or more input devices or may enable communication with one or more input devices. Exemplary input devices may include a keyboard, a mouse, a hand-held controller (which may include a glove or a bracelet), or any other suitable device for receiving action requests and communicating the action requests to the processing subsystem 110.

An action request received by the I/O interface 115 may be communicated to the processing subsystem 110, which may perform an action corresponding to the action request. In some embodiments, the controller 170 may include an IMU 140 that captures inertial data indicating an estimated position of the controller 170 relative to an initial position. In some embodiments, the I/O interface 115 and/or the controller 170 may provide haptic feedback to the user in accordance with instructions received from the processing subsystem 110 and/or the HMD device 105. For example, haptic feedback may be provided when an action request is received or when the processing subsystem 110 communicates instructions to the I/O interface 115, which may cause the controller 170 to generate or direct generation of haptic feedback when the processing subsystem 110 performs an action.

The processing subsystem 110 may include one or more processing devices or physical processors that provide content to the HMD device 105 in accordance with information received from one or more of the depth-sensing subsystem 120, the image capture subsystem 130, the I/O interface 115, and the controller 170. In the example shown in FIG. 1, the processing subsystem 110 may include an engine 160, an application store 150, and a tracking module 155. Some embodiments of the processing subsystem 110 may have different modules or components than those described in conjunction with FIG. 1. Similarly, the functions further described herein may be distributed among the components of the HMD system 100 in a different manner than described in conjunction with FIG. 1.

The application store 150 may store one or more applications for execution by the processing subsystem 110. An application may, in some examples, represent a group of instructions, that when executed by a processor, generates content for presentation to the user. Content generated by an application may be generated in response to inputs received from the user via movement of the HMD device 105 or the controller 170. Examples of applications include gaming applications, conferencing applications, video playback applications, social media applications, or any other suitable applications.

The tracking module 155 may calibrate the HMD system 100 using one or more calibration parameters and may adjust one or more of the calibration parameters to reduce error when determining the position of the HMD device 105 or the hand-held controller 170. For example, the tracking module 155 may communicate a calibration parameter to the depth-sensing subsystem 120 to adjust the focus of the depth-sensing subsystem 120 to more accurately determine positions of structured light elements captured by the depth-sensing subsystem 120. Calibration performed by the tracking module 155 may also account for information received from the IMU 140 in the HMD device 105 and/or another IMU 140 included in the controller 170. Additionally, if tracking of the HMD device 105 is lost or compromised (e.g., if the depth-sensing subsystem 120 loses line of sight of at least a threshold number of structured light elements), the tracking module 155 may recalibrate some or all of the HMD system 100.

The tracking module 155 may track movements of the HMD device 105 or of the hand-held controller 170 using information from the depth-sensing subsystem 120, the image capture subsystem 130, the one or more position sensors 135, the IMU 140, or some combination thereof. For example, the tracking module 155 may determine a position of a reference point of the HMD device 105 in a mapping of the real-world environment based on information collected with the HMD device 105. Additionally, in some embodiments, the tracking module 155 may use portions of data indicating a position and/or orientation of the HMD device 105 and/or the controller 170 from the IMU 140 to predict a future position and/or orientation of the HMD device 105 and/or the hand-held controller 170. The tracking module 155 may also provide the estimated or predicted future position of the HMD device 105 or the I/O interface 115 to the engine 160.

In some embodiments, the tracking module 155 may track other features that can be observed by the depth-sensing subsystem 120, the image capture subsystem 130, and/or by another system. For example, the tracking module 155 may track one or both of the user's hands so that the location of the user's hands within the real-world environment may be known and utilized. In order to simplify the tracking of the user within the real-world environment, the tracking module 155 may generate and/or use a proxy for the user. The proxy can define a personal zone associated with the user, which may provide an estimate of the volume occupied by the user. The tracking module 155 may monitor the user's position in relation to various features of the environment by monitoring the user's proxy or personal zone in relation to the environment. The tracking module 155 may also receive information from one or more eye-tracking cameras included in some embodiments of the HMD device 105 to track the user's gaze.

The image processing engine 160 may generate a three-dimensional mapping of the area surrounding some or all of the HMD device 105 (i.e., the "local area" or "real-world environment) based on information received from the HMD device 105. In some embodiments, the engine 160 may determine depth information for the three-dimensional mapping of the local area based on information received from the depth-sensing subsystem 120 that is relevant for techniques used in computing depth. The engine 160 may calculate depth information using one or more techniques in computing depth from structured light. In various embodiments, the engine 160 may use the depth information to, e.g., update a model of the local area and generate content based in part on the updated model. The engine 160 may also extract aspects of the visual appearance of a scene so that a model of the scene may be more accurately rendered at a later time, as described herein.

The engine 160 may also execute applications within the HMD system 100 and receive position information, acceleration information, velocity information, predicted future positions, or some combination thereof, of the HMD device 105 from the tracking module 155. Based on the received information, the engine 160 may identify content to provide to the HMD device 105 for presentation to the user. For example, if the received information indicates that the user has looked to the left, the engine 160 may generate content for the HMD device 105 that corresponds to the user's movement in a virtual environment or in an environment augmenting the local area with additional content. In order to provide the user with awareness of his or her surroundings, the engine 160 may present a combination of the virtual environment and the model of the real-world environment as is described herein in further detail. Additionally, the engine 160 may perform an action within an application executing on the processing subsystem 110 in response to an action request received from the I/O interface 115 and/or the hand-held controller 170 and provide visual, audible, and/or haptic feedback to the user that the action was performed.

Figure 2:
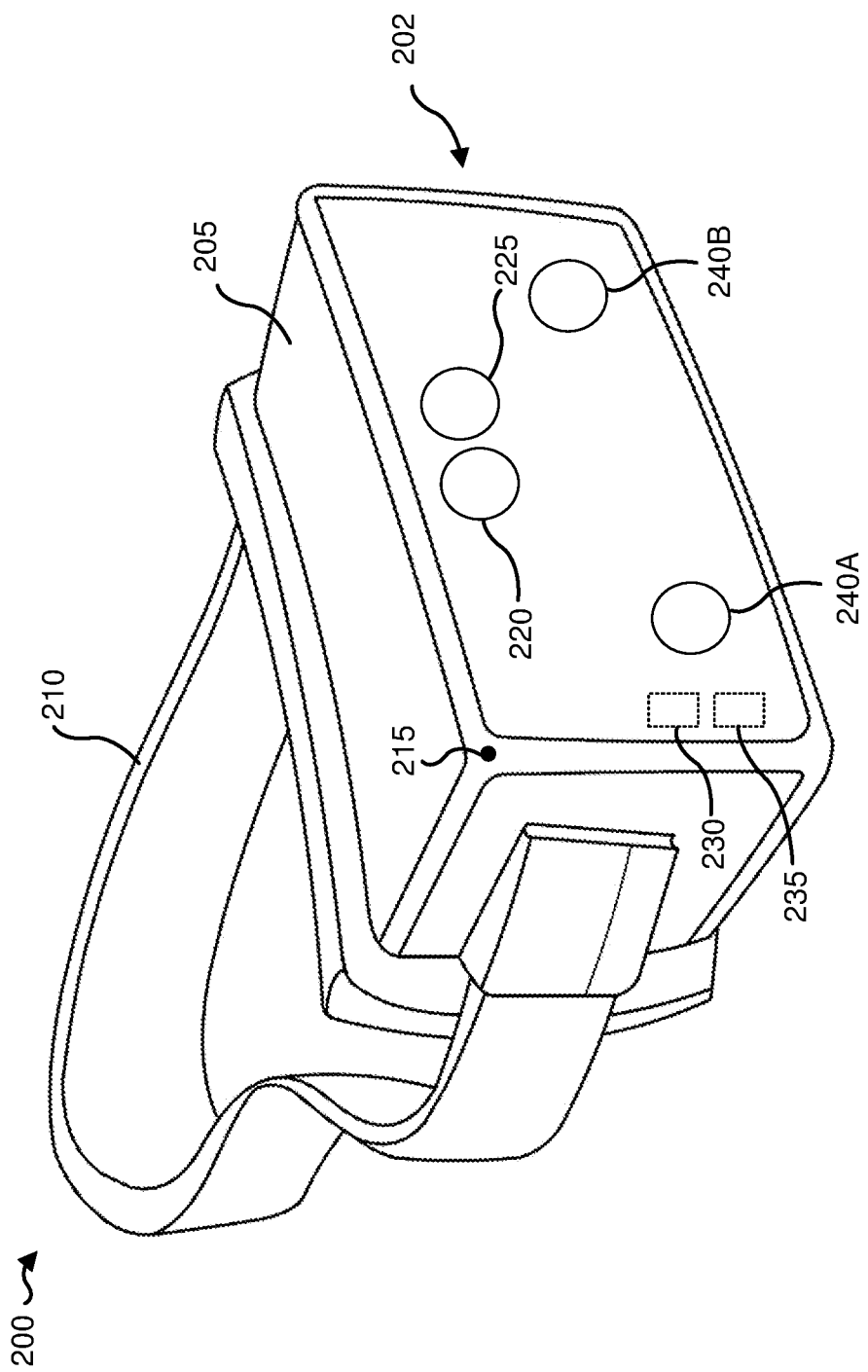
FIG. 2 is a perspective view of an exemplary HMD device that may be included in the HMD system of FIG. 1, according to some embodiments.

FIG. 2 is a diagram of an HMD device 200, in accordance with one embodiment of the HMD device 105. The HMD device 200 may include an imaging subsystem and a depth-sensing subsystem. In some embodiments, the imaging subsystem and the depth-sensing subsystem may be provided by a single set of sensors providing data that can be processed for imaging purposes and for depth mapping purposes. The HMD device 200 may be part of, e.g., a VR system, an AR system, an MR system, or some combination thereof. In embodiments that describe an AR system and/or an MR system, portions of a front side 202 of the HMD device 200 are at least partially transparent in the visible band (about 380 nanometers (nm) to 750 nm). More specifically, portions of the HMD device 200 that are between the front side 202 of the HMD device 200 and an eye of the user may be at least partially transparent (e.g., a partially-transparent electronic display 125). In other embodiments, the front side 202 is opaque, preventing the user from seeing the real-world environment and any potential collision risks therein. The HMD device 200 may include a front rigid body 205 housing the electronic display 125 and other components, a user attachment system such as a band 210 that secures the HMD device 200 to a user's head, and a reference point 215 that can be used characterize a position and/or orientation of the HMD device 200.

The HMD device 200 may include an imaging aperture 220 and an illumination aperture 225. An illumination source included in the depth-sensing subsystem 120 may emit light (e.g., structured light) through the illumination aperture 225. An imaging device of the depth-sensing subsystem 120 may capture light from the illumination source that is reflected or backscattered from the local area through the imaging aperture 220. Embodiments of the HMD device 200 may further include cameras 240A and 240B that may be components of the image capture subsystem 130 of FIG. 1.

The front rigid body 205 may include one or more electronic display elements, one or more integrated eye-tracking systems, an IMU 230, one or more position sensors 235, and the reference point 215. The IMU 230 may represent an electronic device that generates fast calibration data based on measurement signals received from one or more of the position sensors 235. The position sensors 235 may generate one or more measurement signals in response to motion of the HMD device 200.

Figure 3:
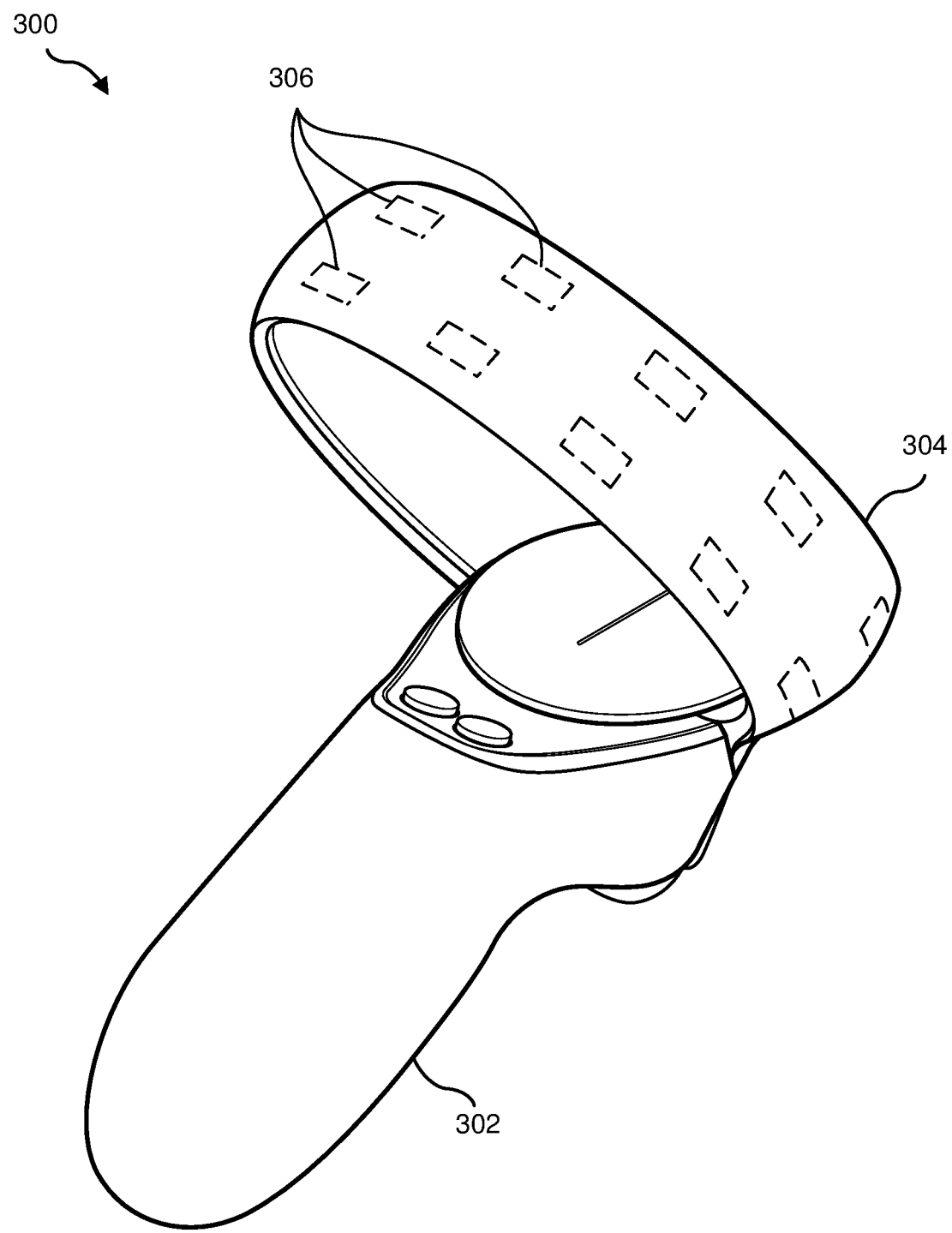
FIG. 3 is a perspective view of an exemplary hand-held controller that may be included in the HMD system of FIG. 1, according to some embodiments.

FIG. 3 is a perspective view of an exemplary hand-held controller 300 that may be an embodiment of the hand-held controller 170 included in the HMD system 100 of FIG. 1, in accordance with some embodiments. The HMD system 100 may include one or more hand-held controllers like the controller 300. For example, the HMD system 100 may include two hand-held controllers 300, with one hand-held controller 300 for each of a user's right and left hands. Each hand-held controller 300 may be communicatively coupled to the HMD device 105 and/or to a computing device (e.g., a personal computer, the processing subsystem 110, etc.). The hand-held controller 300 may be communicatively coupled to the HMD device 105 via any suitable wireless and/or wired connection.

As shown in FIG. 3, the hand-held controller 300 may include a grip 302 sized to fit within a user's hand. The hand-held controller 300 may also include a tracking loop 304 for tracking position, orientation, and/or movement of the hand-held controller 300 with respect to the HMD device 105 and/or with respect to the real-world environment. In some embodiments, the tracking loop 304 may include one or more tracking lights, such as array of tracking lights 306. The array of tracking lights 306 may include tracking LEDs (e.g., infrared (IR) LEDs) that are used for motion and positional tracking purposes to provide 360-degree motion control while using the HMD system 100. The controller 300 may include tracking lights on any suitable portion of the controller 300. In some examples, the tracking lights 306 of the hand-held controller 300 may emit light having wavelengths greater than approximately 700 nm and less than approximately 900 nm. In one embodiment, the tracking lights 306 of the hand-held controller 300 may emit light having a wavelength of approximately 850 nm (e.g., between approximately 840 nm and 860 nm or between approximately 830 nm and 870 nm).

In at least one embodiment, the cameras 240A and 240B may receive light emitted by the tracking lights 306 on the hand-held controller 300, and the tracking module 155 may utilize the received light to determine location, orientation, and/or movement of the hand-held controller 300 relative to the HMD device 105 and/or another reference frame, such as a reference frame of the real-world environment. In some embodiments, the hand-held controller 300 may be secured around the user's hand or wrist, e.g., like a glove or a bracelet.

Figure 4A:
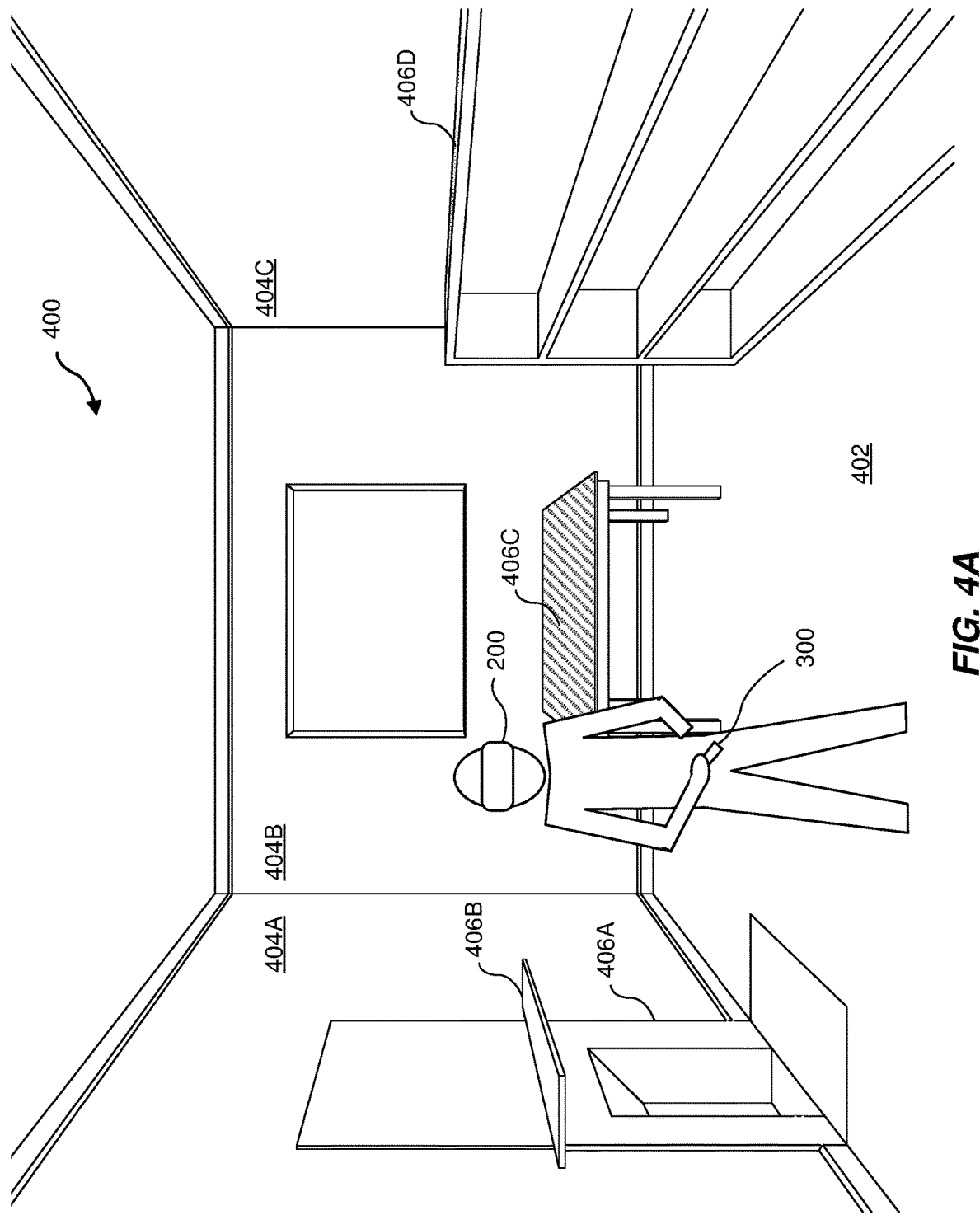
FIGS. 4A and 4B present a perspective view and a top view, respectively, of a user wearing the HMD device of FIG. 2 and holding the hand-held controller of FIG. 3 in a real-world environment, according to some embodiments.
Figure 4B:
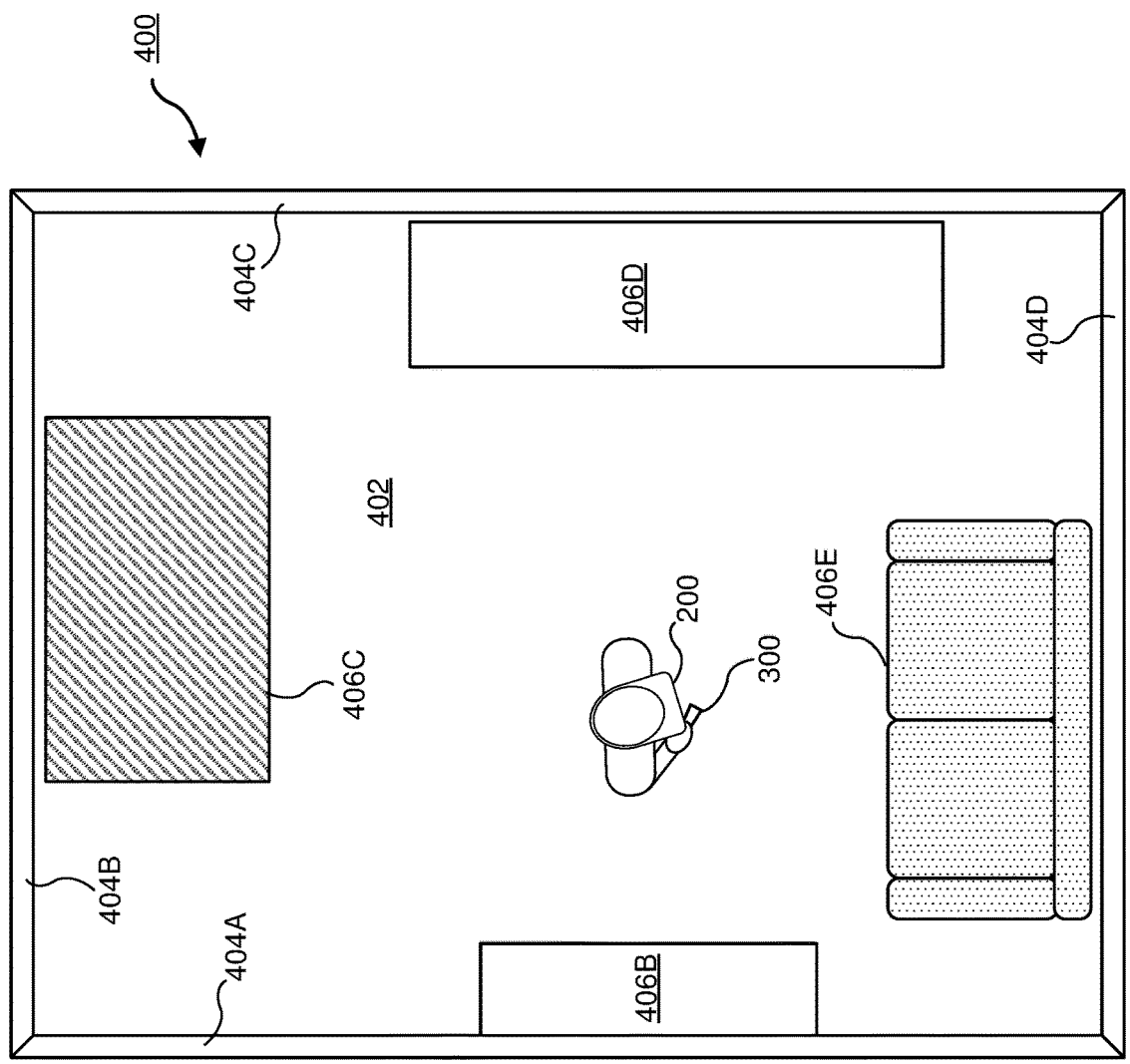

FIGS. 4A and 4B present a perspective view and a top view, respectively, of a user wearing the HMD device 200 of FIG. 2 and holding the hand-held controller 300 of FIG. 3 in an exemplary real-world environment 400, such as a living room, according to some embodiments. The real-world environment 400 may include a base plane 402, also referred to as a floor 402, and walls 404A, 404B, 404C, and 404D, collectively referred to as walls 404. The real-world environment 400 may further include a plurality of objects or features within the room that pose collision risks when the user's view is obstructed by the HMD device 200. For example, the environment 400 may include a fireplace 406A having a protruding mantelpiece 406B, a table 406C, and shelves 406D. The environment 400 may further include a sofa 406E, as shown in FIG. 4B. The objects and features 406A, 406B, 406C, 406D, and 406E may be referred to, along with the walls 404, as features 406 of the real-world environment 400.

In some embodiments, the user may move within the real-world environment 400 in order to move within a virtual environment displayed in the HMD device 200. In other words, as the user moves within the real-world environment 400, the images of a virtual environment shown in the electronic display 125 of the HMD device 200 may be correspondingly updated based on the user's movements. Accordingly, the user may move relative to the virtual environment as the user moves in the real-world environment 400. As described in greater detail below, embodiments of the systems and methods described herein may enable the user to be made aware of the local environment to prevent the user from colliding with any of the features 406 when the user cannot see the real-world environment (due to, e.g., obstruction of the user's real-world view by the HMD device 200).

Figure 5A:
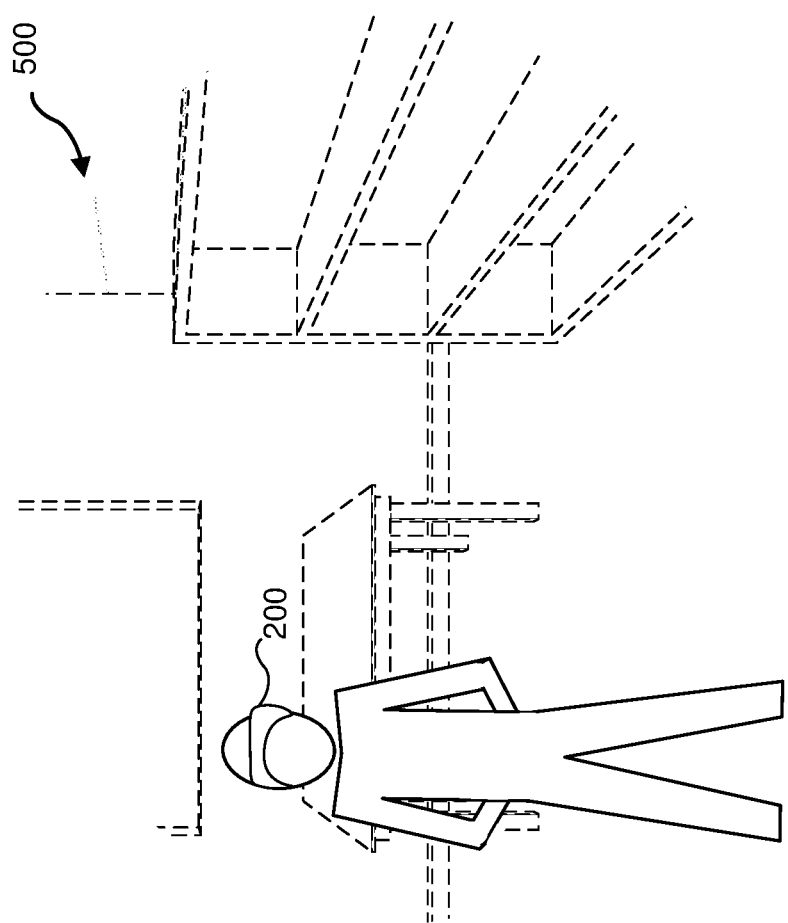
Figure 5B:
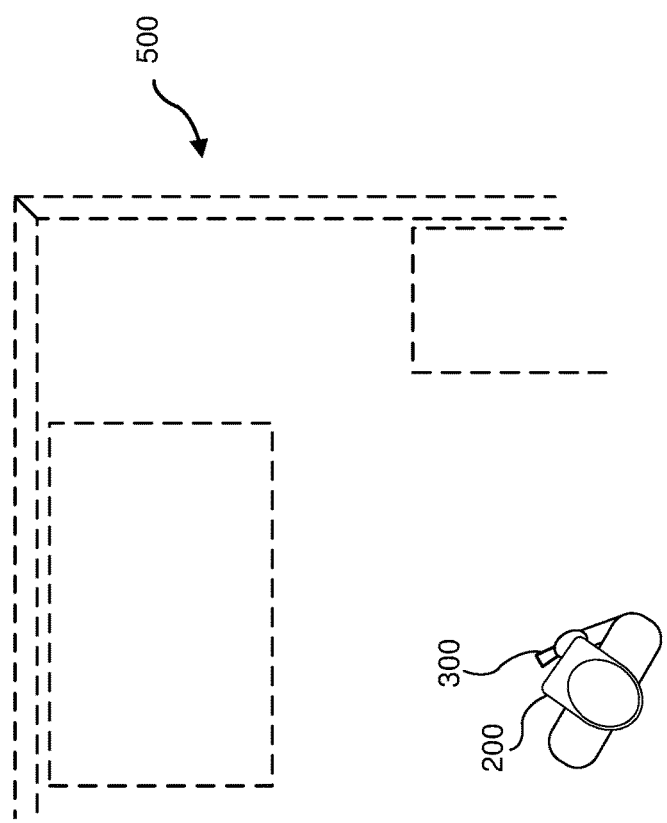
FIGS. 5B, 6B, and 7B present top views, corresponding to FIGS. 5A, 6A, and 7A, respectively, of a user wearing the HMD device of FIG. 2 to generate the model of a real-world environment, according to some embodiments.
Figure 6B:
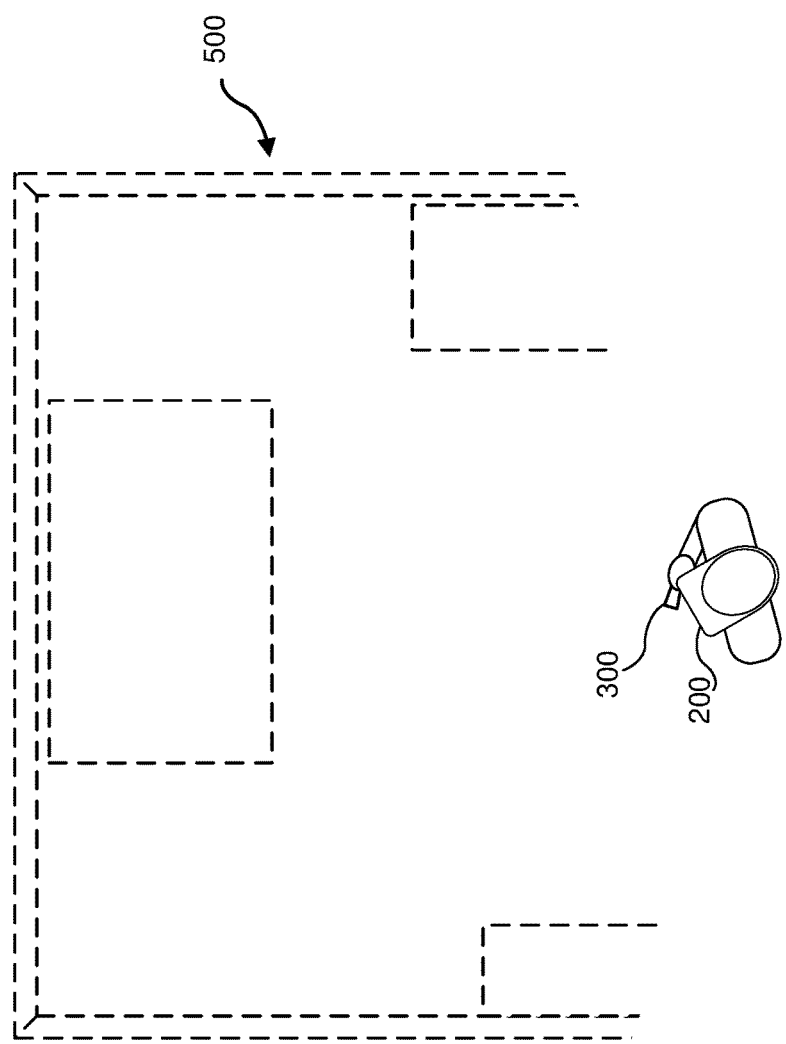
Figure 7A:
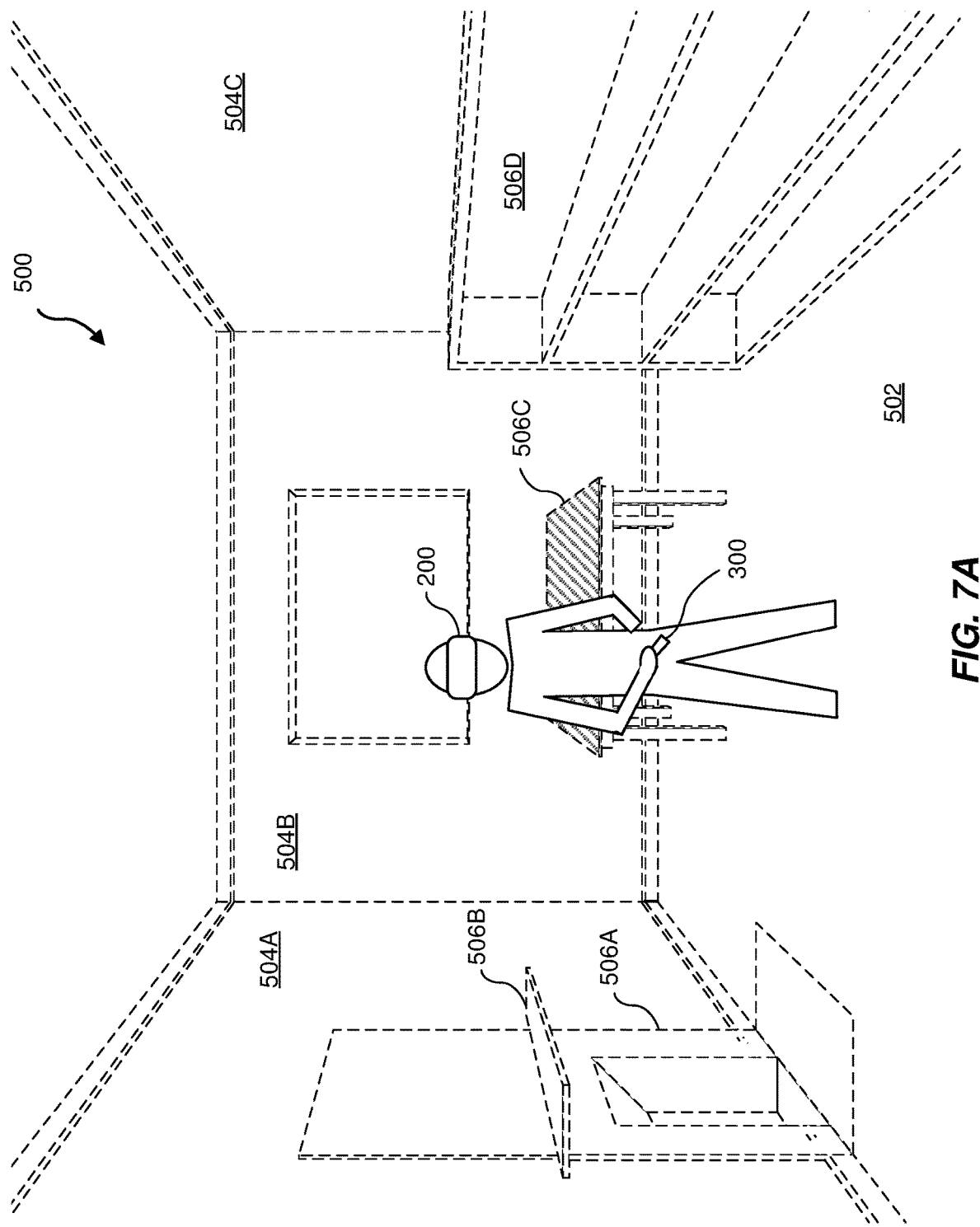
Figure 7B:
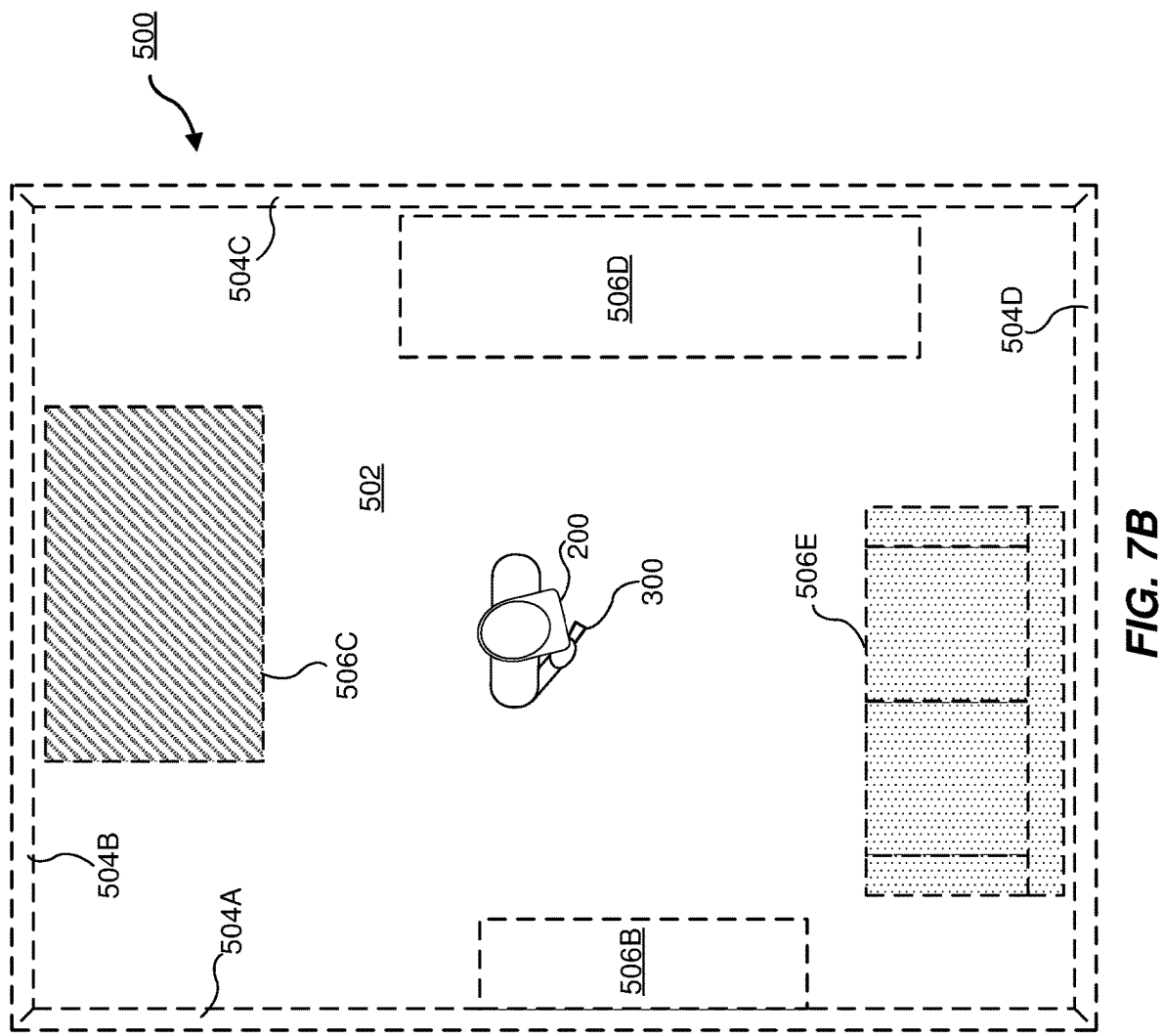

Referring now to FIGS. 5A-B, 6A-B, and 7A-B, in order to show the user a portion of a model of his or her environment so that the user can avoid a collision risk, the HMD system 100 may generate such a model. FIGS. 5A, 6A, and 7A present perspective views of a user wearing the HMD device of 200 of FIG. 2 for generation of a model of a real-world environment during a training phase, according to some embodiments. FIGS. 5B, 6B, and 7B present top views, corresponding to FIGS. 5A, 6A, and 7A, respectively, of the user wearing the HMD device 200.

When the user is setting up the HMD system 100 and the HMD device 200 for use in an environment, such as a living room or family room, for the first time, the HMD system 100 may prompt the user to collect depth and image information from the environment. In this way, the HMD system 100 may be trained with respect to the environment. This may be done by providing the user with a visual prompt in the electronic display 125 and/or an audio instruction to the user, directing the user to manipulate the HMD device 200 to collect data. Because various sensing subsystems of the HMD device 200 may collect data that is generally in front of the HMD device 200, the user may be instructed to take steps to visualize the entire environment.

FIGS. 5A and 5B show the user collecting data for model generation by orienting the HMD device 200 toward a first portion of the real-world environment. The model 500 may be generated while the data is being collected as shown in FIGS. 5A and 5B, or the model may be generated after data has been collected for the entire real-world environment 400. For example, the depth-sensing subsystem 120 and/or the image capture subsystem 130 may collect data from the environment, which may be processed by the processing subsystem 110 and/or the engine 160 to generate the model 500 and to determine the user's position with respect to the model 500. The tracking module 155, or another component of the HMD system 100, may monitor which portions of the real-world environment 400 have been adequately captured by the user's manipulation. The HMD system 100 may direct the user to orient the HMD device 200 to capture additional portions of the environment 400, until all or substantially all of the environment 400 has been adequately observed. As more of the environment 400 is viewed, more of the model 500 may be completed. In some embodiments, the model 500 may only be generated after the HMD system 100 determines that a sufficient portion of the environment has been observed, as shown in FIGS. 6A-6B and 7A-7B. In some embodiments, the model 500 may include representations of various physical surfaces including dominant planes, such as a floor plane, a ceiling plane, and/or wall planes, and representations of other features, such as furniture, light fixtures, etc.

As shown in FIGS. 7A and 7B, the model 500 may be rendered based on the visual appearance of the real-world environment 400. As shown in FIGS. 7A and 7B, the model 500 may include models of the features 406, including a fireplace model 506A having a protruding mantelpiece model 506B, a table model 506C, a shelf model 506D, and a sofa model 506E (shown in FIG. 7B). The rendered table model 506C may have a striped appearance that is the same as or similar to the appearance of the table 406C. The striped appearance may appear on one or more of the physical surfaces included in the rendered table model 506C. Similarly, the rendered sofa model 506E may be rendered according to one or more visual aspects, extracted from image data captured by the image capture subsystem 130. For example, the sofa model 506E may be rendered with a dotted fabric pattern similar to the pattern of the sofa 406E. Rendering the features of the model 500 with skins or textures that are similar to or the same as the colors, patterns, and textures of the real-world may help the user recognize the rendered model 500 as corresponding to the real-world environment 400.

Figure 8:
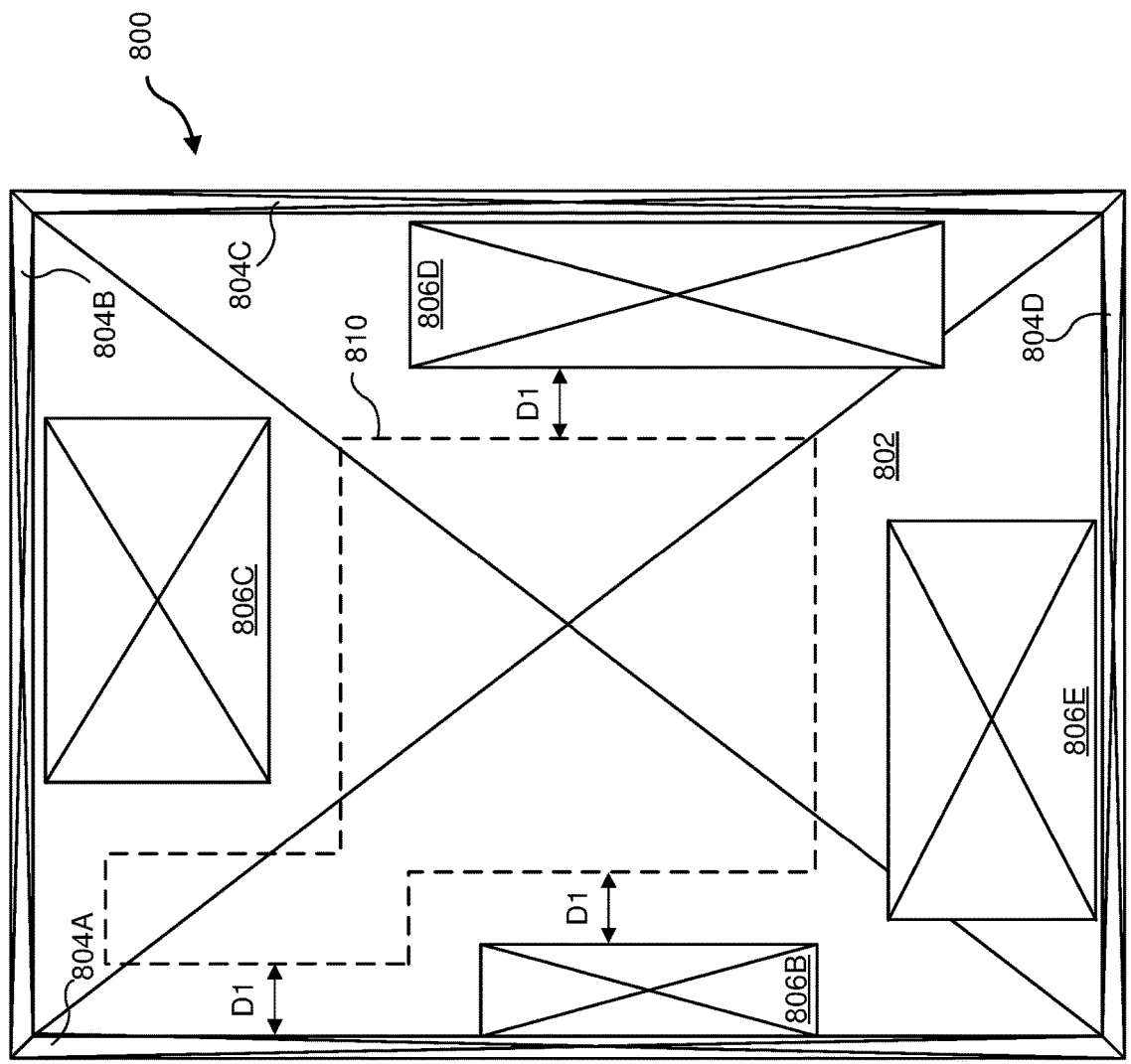
FIG. 8 is a top view of a simplified surface-based model of the real-world environment of FIGS. 4A and 4B, including a safety boundary, according to some embodiments.

FIG. 8 is a top view of a simplified model 800 of the real-world environment of FIGS. 4A and 4B, including a safety boundary, according to some embodiments. The model 800 may include only a few primary surfaces and may be rendered to produce the model 500 as shown in FIGS. 7A and 7B. For purposes of localization and determination of the user's position with respect to the real-world environment 400, the model 800 may include simplified planar features derived from the real-world environment 400. The planes may be joined to form simplified rectangular models of the features of the real-world environment. In some embodiments, these planes may then be rendered based the captured image information, including various visual aspects, from the corresponding features of the real-world environment 400 to create the model 500. Additionally, the processing subsystem 110 may generate a safety boundary 802 that may be used in determining when the user is presented with a portion of the model 500 in additional to a virtual environment in the electronic display 125 of the HMD device 200. For example, the processing subsystem 110 may generate the safety boundary 802 based on a safe separation distance from the features of the model 800. In some embodiments, such a safety boundary 802 may be generated based on a separation distance D1 from all potential collision risks in the model 800. The separation distance D1 may range from less than 0.5 meters to over 1 meter depending on the model 800 and the speed at which a user is moving within the environment 400.

Figure 9B:
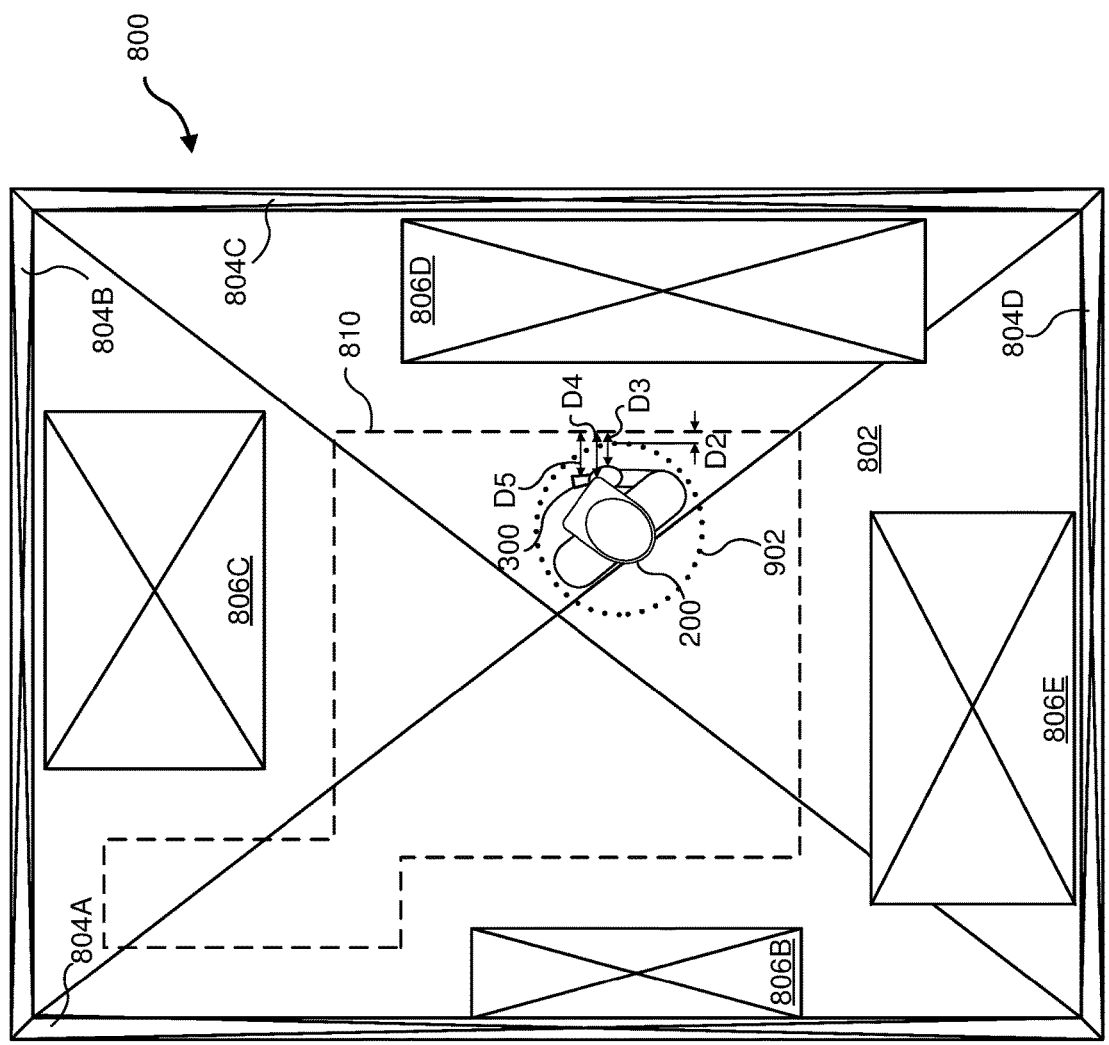
FIGS. 9B, 10B, and 11B present corresponding top views of the user interacting with a virtual environment and the generated model of the real-world environment, according to some embodiments.

Referring now to FIGS. 9A-B, 10-B, and 11A-B, when the HMD device 200 presents a user with a virtual environment 900 and the user's location indicates an elevated risk of collision, the electronic display 125 may also present a portion of the model 500 to orient the user to his or her location relative to the real-world environment 400. As shown in FIG. 9A, a virtual environment 900 may be rendered and a portion of the virtual environment may be displayed in the HMD device 200 according to the position and orientation of the HMD device 200. Because the user controls the position and orientation of the HMD device 200 by walking around in the real-world environment 400 and by "looking" in a particular direction, the user can control what portion of the virtual environment 900 is displayed in the HMD device 200.

As described herein, a proxy location or personal zone may be utilized by the HMD system 100 to simplify determinations of the user's position with respect to the real-world environment 400. The personal zone 902 may include a substantially cylindrical portion 902A and a substantially hemispherical portion 902B. Other geometries may be used to construct the personal zone 902, in other embodiments. The hemispherical portion 902B may be centered around the HMD device 200. The cylindrical portion 902A may extend downward from the hemispherical portion 902B to the floor. Other volumes may be used to provide the personal zone 902. The diameter of the cylindrical portion 902A may be determined by the tracked locations of one or more hand-held controllers 170 and/or by the tracked locations of the hands of the user, such that when the user's arms are extended the diameter of the personal zone 902 may be dynamically increased. In other embodiments, a fixed size of the personal zone 902 may be used and may be large enough to cover a maximum reach of a user.

In order to assess the risk of a potential collision between the user and a feature of the real-world environment 400, the distance between various features of the real-world environment 400 and the personal zone 902 may be used. As shown in FIG. 9B, which includes a representation of the safety boundary 802, the processing subsystem 110 may determine the risk of a potential collision based on one or more distances. As shown, the user's personal zone 902 may be determined to be a distance D2 from the safety boundary 810. At the same time, the processing subsystem 110 may determine that the user's hand is a distance D3 from the safety boundary, the HMD device 200 is a distance D4 from safety boundary 810 and the hand-held controller 300 is a distance D5 away from the safety boundary 810. Because the personal zone 902 extends further away from the user, the personal zone 902 is closest to the safety boundary 810. The processing subsystem 110 may use one or more distances in assessing the user's position with respect to the safety boundary 810 and/or with respect to features included in the model of the real-world environment 400.

Returning to FIG. 9A, the processing subsystem 110 may direct display of a window 904 in which a portion of the model 500 is rendered. The window 904 may have a rendered boundary to more clearly separate the rendered portion of the model 500 from the rendered portion of the virtual environment 900, in some embodiments. Other embodiments may not include any such boundary surrounding the window 904. By rendering a portion of the model 500 to fill the window 904, the HMD system 100 may intuitively provide the user with an awareness of his or her location with respect to the real-world features represented by the model 500.

Figure 10A:
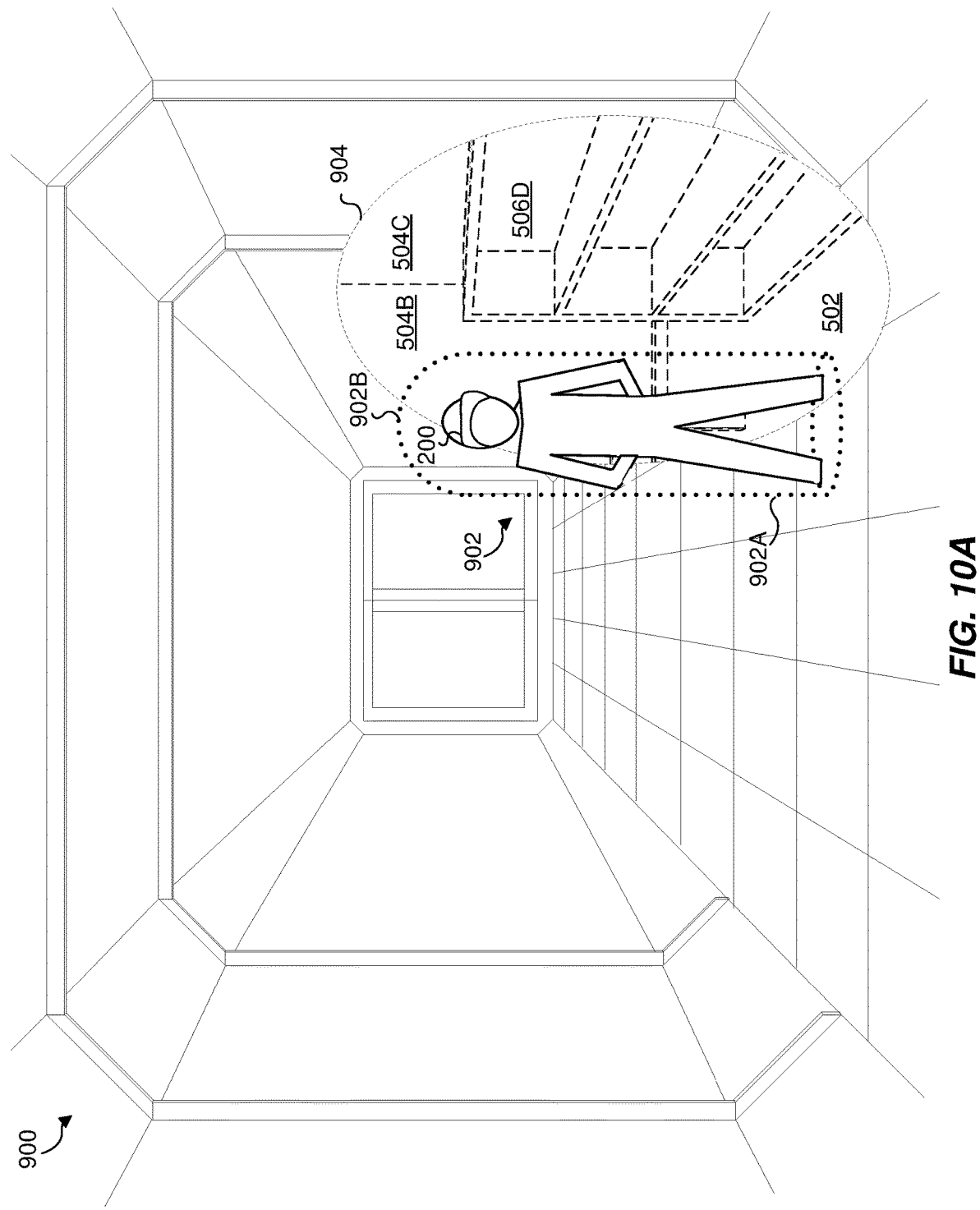
Figure 10B:
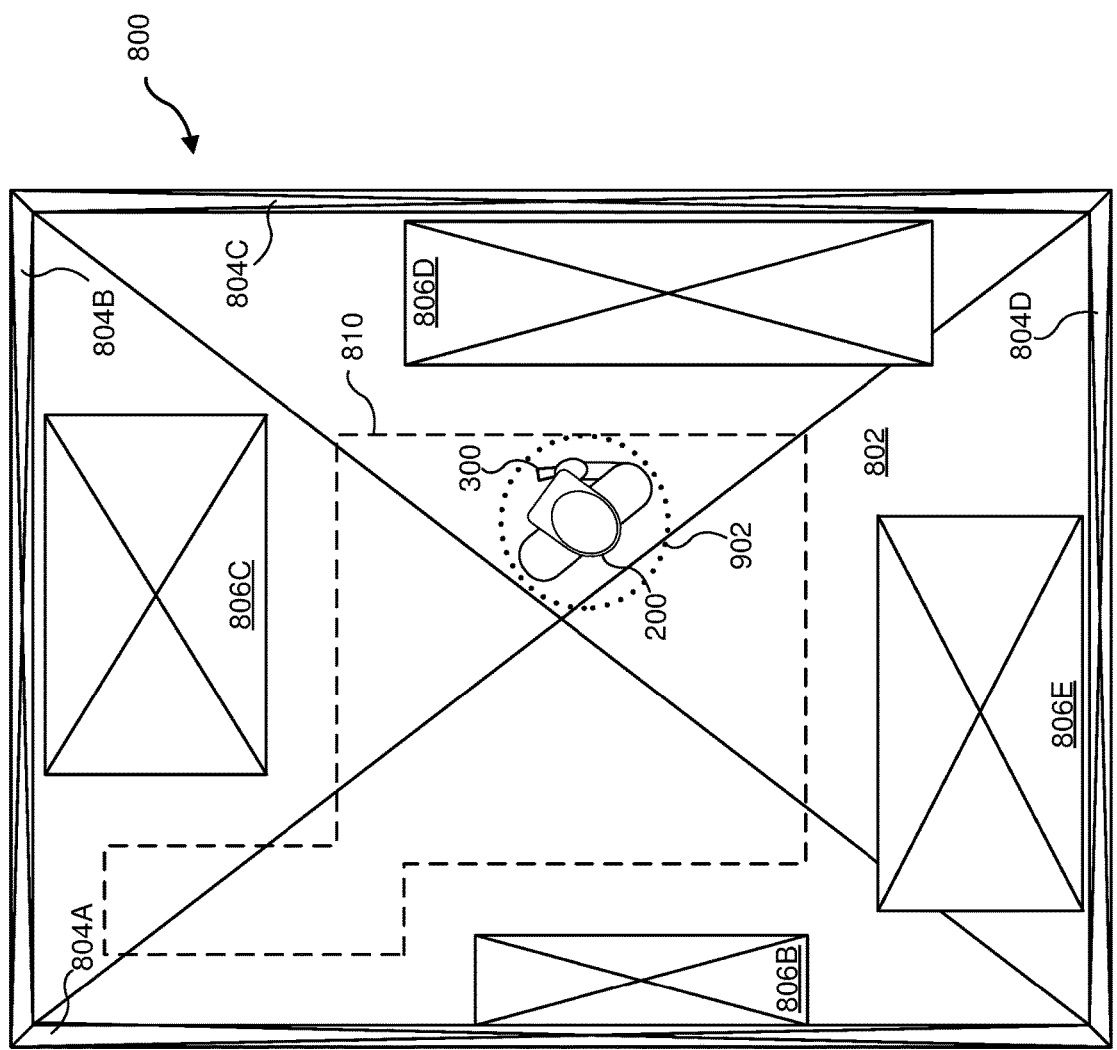

As shown in FIGS. 10A and 10B, the user may to move within the real-world environment 400 such that the personal zone 902 is coincident with the safety boundary 810. The HMD system 100 may cause the window 904 to be increased in size, such that a greater percentage of the user's view is occupied by the portion of the model 500. As distance between the personal zone 902 and the safety boundary 810 decreases, the size of the window 904 may be increased in a linear or nonlinear manner. When the personal zone 902 is dynamically dimensioned, the distance between the personal zone 902 and the safety boundary 810 may decrease when the user extends his or her hands outwardly, even if the user's feet remain stationary. In such instances, the processing subsystem 110 may determine that the distance is caused by the user's hand and may center the window 904 about a position of the user's hand. The user's hand may appear to the user to be "reaching into" the model 500 through the virtual environment 900, giving the user a simulated view of the real-world environment 400.

Figure 11A:
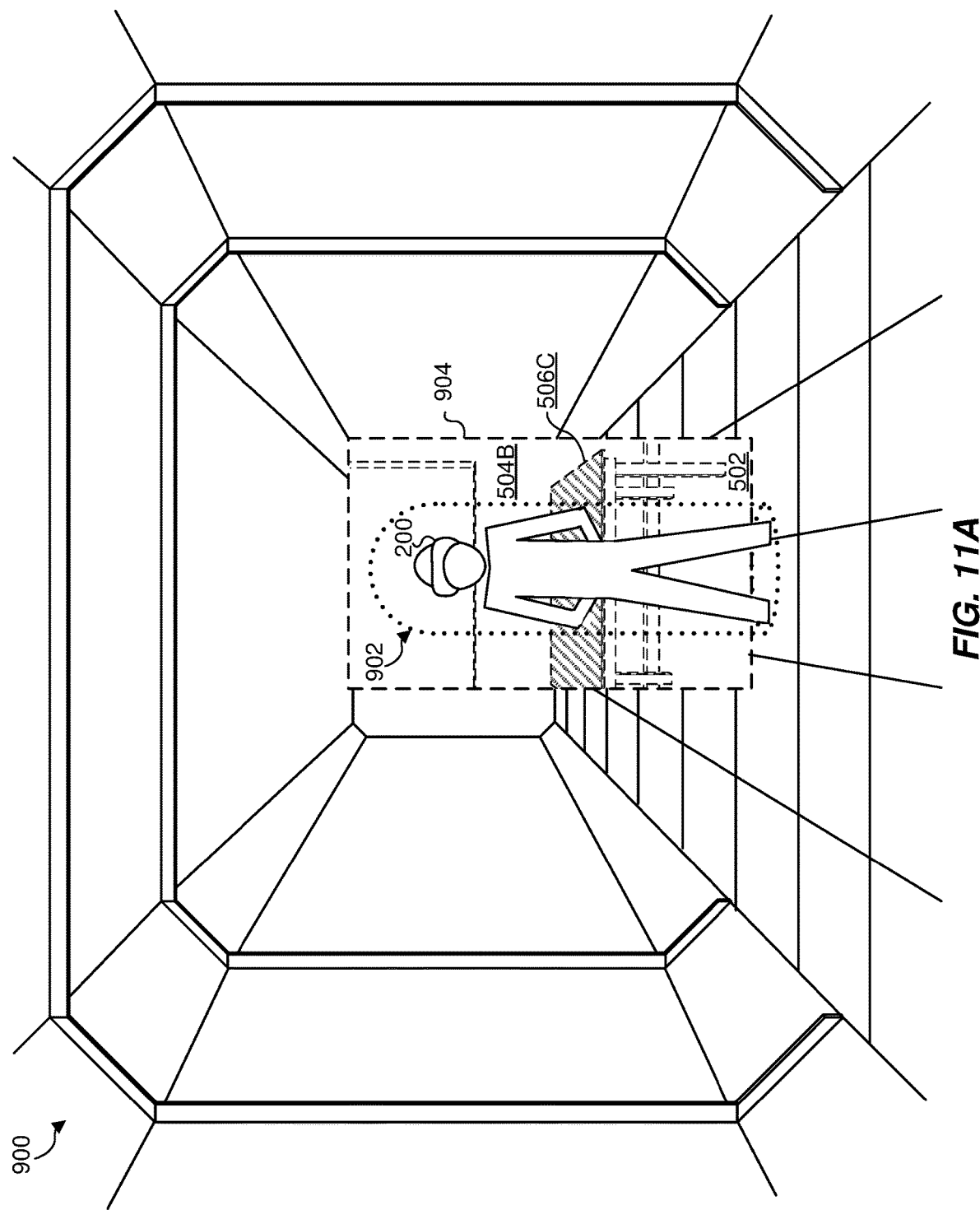
Figure 11B:
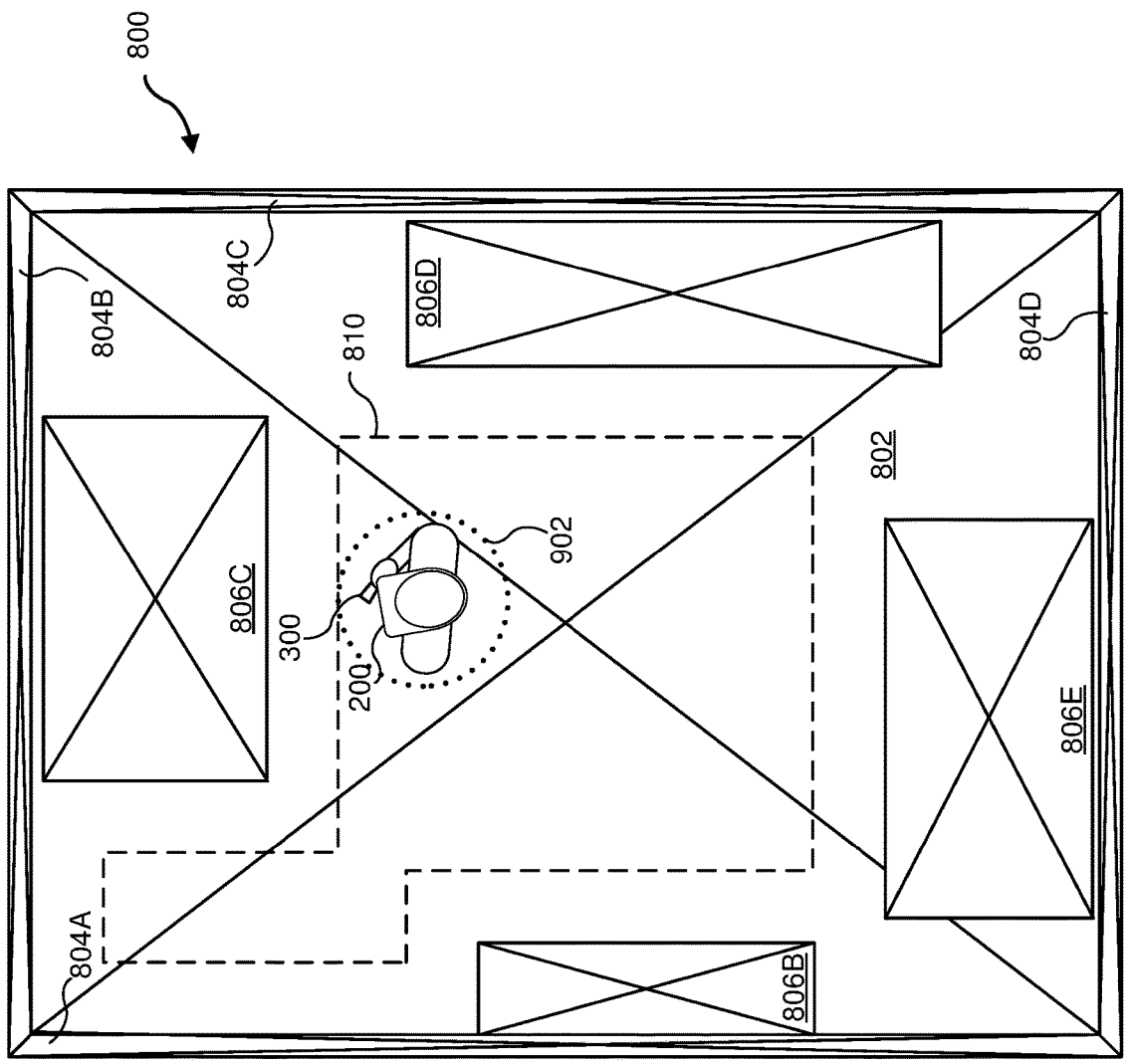

As shown in FIGS. 11A and 11B, the model 500 shown in the window 904 may include aspects of the visual appearance of features of the real-world environment. The rendered portion of the model 500 includes a rendered table model 506C having a striped appearance based on the striped appearance of the real-world table 406C. The window 904 as shown in FIG. 11A has a generally rectangular shape. In other embodiments, the window 904 may be presented in a variety of shapes, including spherical, elliptical, square, etc. The location of the window 904 may be higher or lower depending on source of the risk. For example, a window 904 that includes a portion of the model 500 including the sofa model 506E may be lower than a window showing the model mantelpiece 506B, because the mantelpiece 406B has a higher position in the environment 400 than the sofa 406E. Embodiments of the window 904 may start at a predetermined base size and an increase to a maximum that does not exceed a predetermined percentage of the total view provided to the user in the HMD device 200. In other embodiments, the window 904 may expand to fill the entire view provided by the electronic display 125 of the HMD device 200.

In some embodiments, the window 904 may not be fully occupied by a rendered portion of the model 500. For example, the window 904 may be provided by having some pixels of the electronic display 125 show image data from the model 500 while other pixels of the electronic display 125 show image data from the virtual environment 900. This may provide for a transparency effect, in which the electronic display 125 depicts both a portion of the model 500 and the virtual environment 900. The degree of transparency may be changed as the distance between the personal zone 902 and the safety boundary 810 increases or decreases. For example, the portion of the model 500 may be rendered to appear less transparent as the distance decreases. The change in transparency may be performed in addition to, or as an alternative to, any change in the size of the window 904.

In this way, the user may be informed of his or her position within the real-world 400 while remaining engaged in the experience of the virtual environment 900. The presentation of the model 500 along with the virtual environment 900 may allow the user to avoid collisions. Additionally, because the user may want to be fully engaged in any events depicted in the virtual environment 900, the user may be naturally motivated to move away from potential obstacles (i.e., to move to a safer position in the environment 400) so that the user's view of the virtual environment 900 may be unaffected.

Figure 12A:
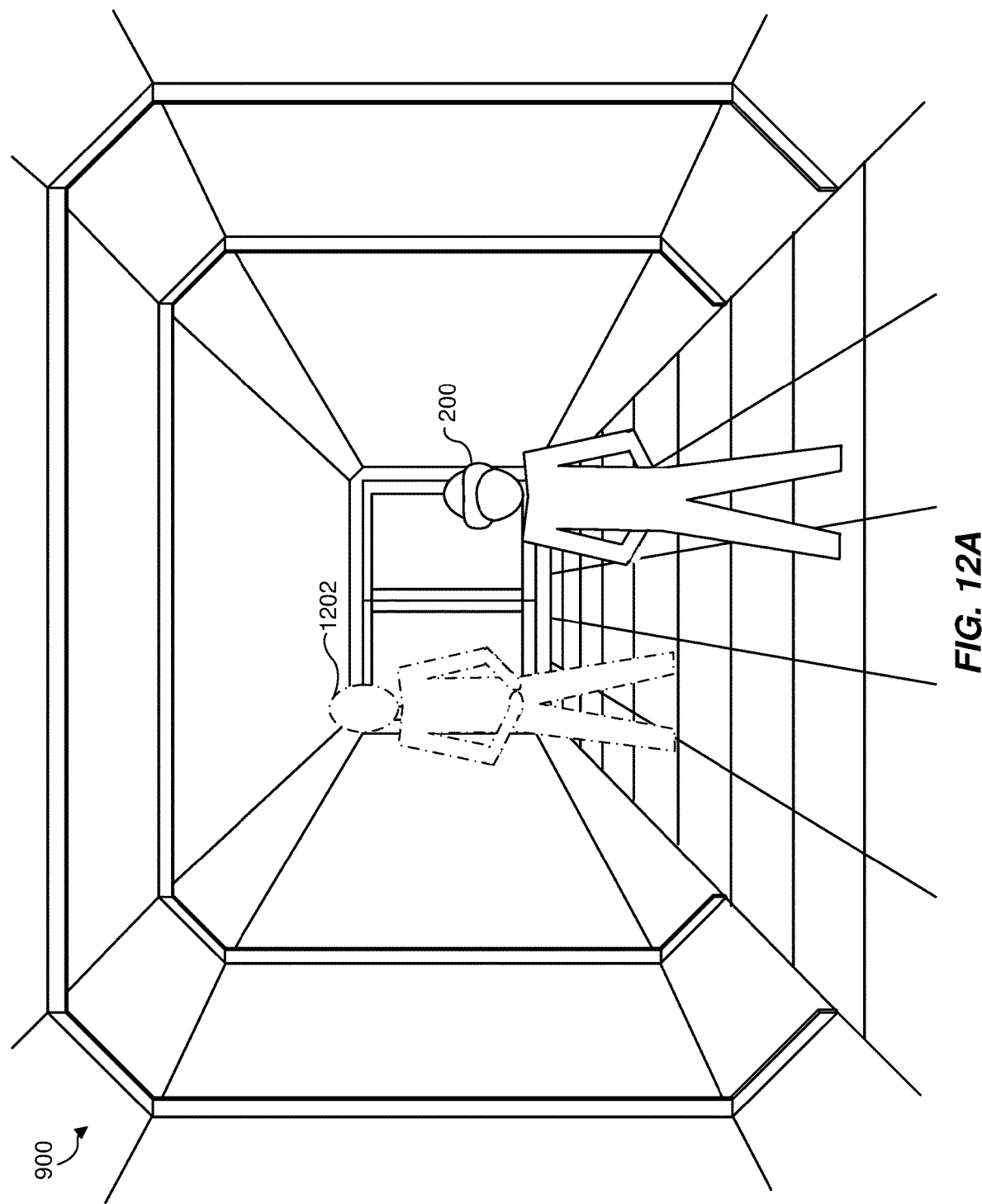
FIG. 12A presents a perspective of a dynamic hazard as presented to a user wearing the HMD device of FIG. 2, according to some embodiments.
Figure 12B:
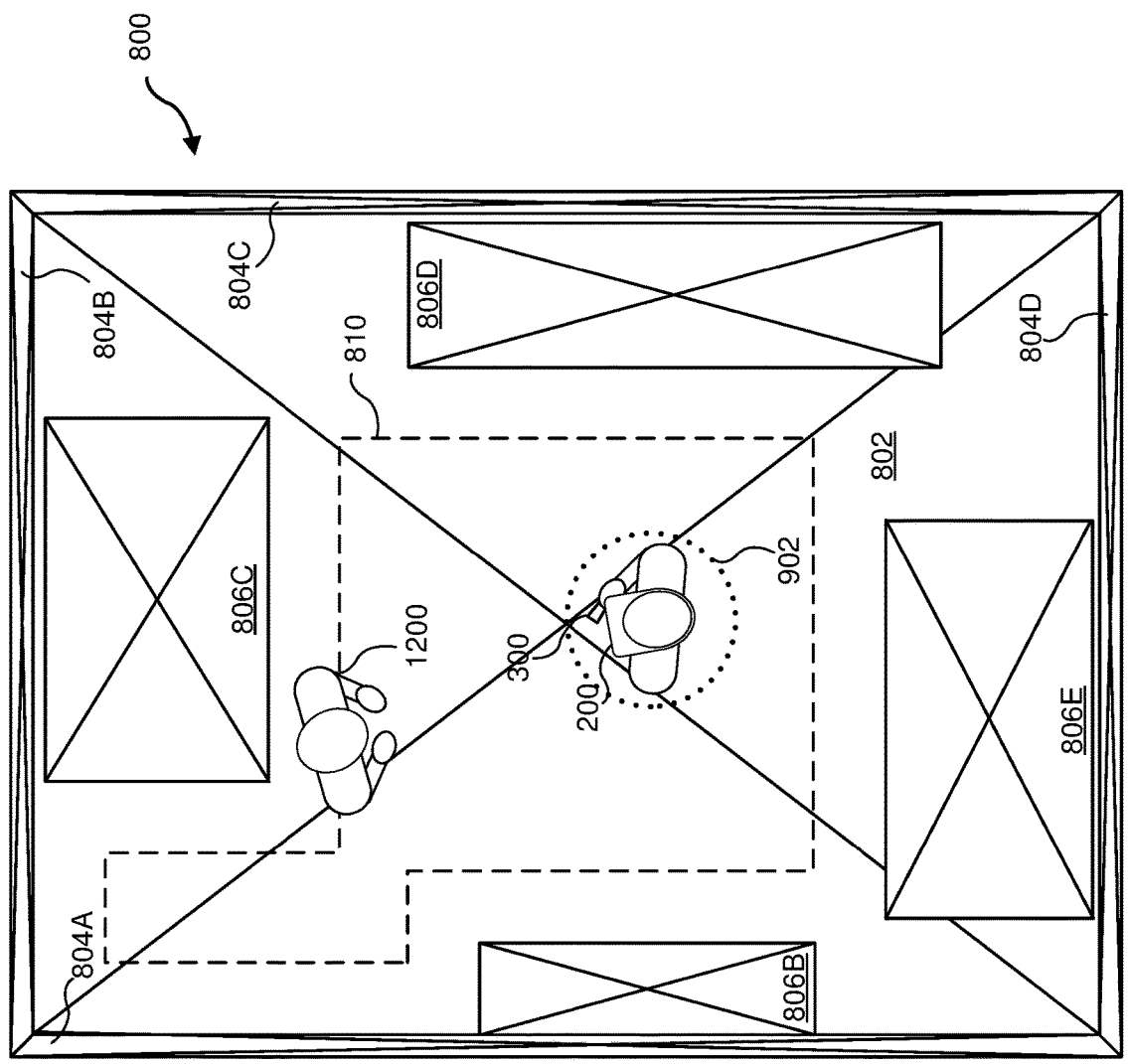
FIG. 12B presents a top view of a dynamic hazard in the context of a simplified model of the real-world environment, according to some embodiments.

In some instances, one or more potential hazards may arise during use of the HMD system 100, such that they may not be accounted for in the model 500. FIG. 12A is a perspective view that shows how a user may be informed of a dynamic hazard present in the real-world environment 400. FIG. 12B shows that the simplified model 800 may be updated dynamically during a VR session. For example, while the user is engaged with the virtual environment 900, a dynamic hazard 1200 may enter the real-world environment 400. Examples of dynamic hazards 1200 may include people, pets, or other moving objects, in addition to changes in the features 406 of the real-world environment 400. Exemplary changes may include a change in the position of the sofa 406E that occurred after the model 500 was generated by the HMD system 100. The dynamic hazard 1200 may be observed by the depth sensing subsystem 120 and/or the image capture subsystem 130, as shown in FIG. 12B.

In order to communicate the presence of the dynamic hazard 1200 to the user, a model 1202 of the dynamic hazard 1200 may be rendered and displayed in connection with the virtual environment 900. In some embodiments, the model 1202 may be rendered as a monochromatic shape corresponding to the shape of the dynamic hazard 1200 as observed by the sub systems of the HMD device 200. The shape may be updated as the dynamic hazard 1200 moves or changes, while the visual appearance may remain otherwise consistent, presenting a silhouette of the hazard. In other embodiments, image information characterizing the dynamic hazard 1200 may be rendered as the model 1202. For example, when the dynamic hazard 1200 is another person, the image capture subsystem 130 may capture images including the person, identify the boundaries of the person to isolate the portion of the captured images associated with the person from background portions, and display those isolated portions in the rendered view presented in the electronic display 125. Because the captured images may be captured at a resolution different than the rendered resolution of the virtual environment 900, the model 1202 may be presented at an apparent resolution that is lower than the apparent resolution of the virtual environment 900 (e.g., the model 1202 may be textured with a lower resolution texture than other portions of virtual environment 900).

In some embodiments, any dynamic hazard 1200 may be rendered and displayed in the electronic display 125 regardless of the distance between the dynamic hazard 1200 and the personal zone 902. In other embodiments, the processing subsystem 110 may determine a threshold separation distance to be used in determining when to display the model 1202. When the user moves such that the personal zone 902 and the dynamic hazard 1200 are closer than the threshold separation distance, the model 1202 may be presented to the user along with the virtual environment 900. In this way, the user may be informed of dynamic hazards within the real-world environment even while the user remains immersed in the virtual environment 900.

Figure 13A:
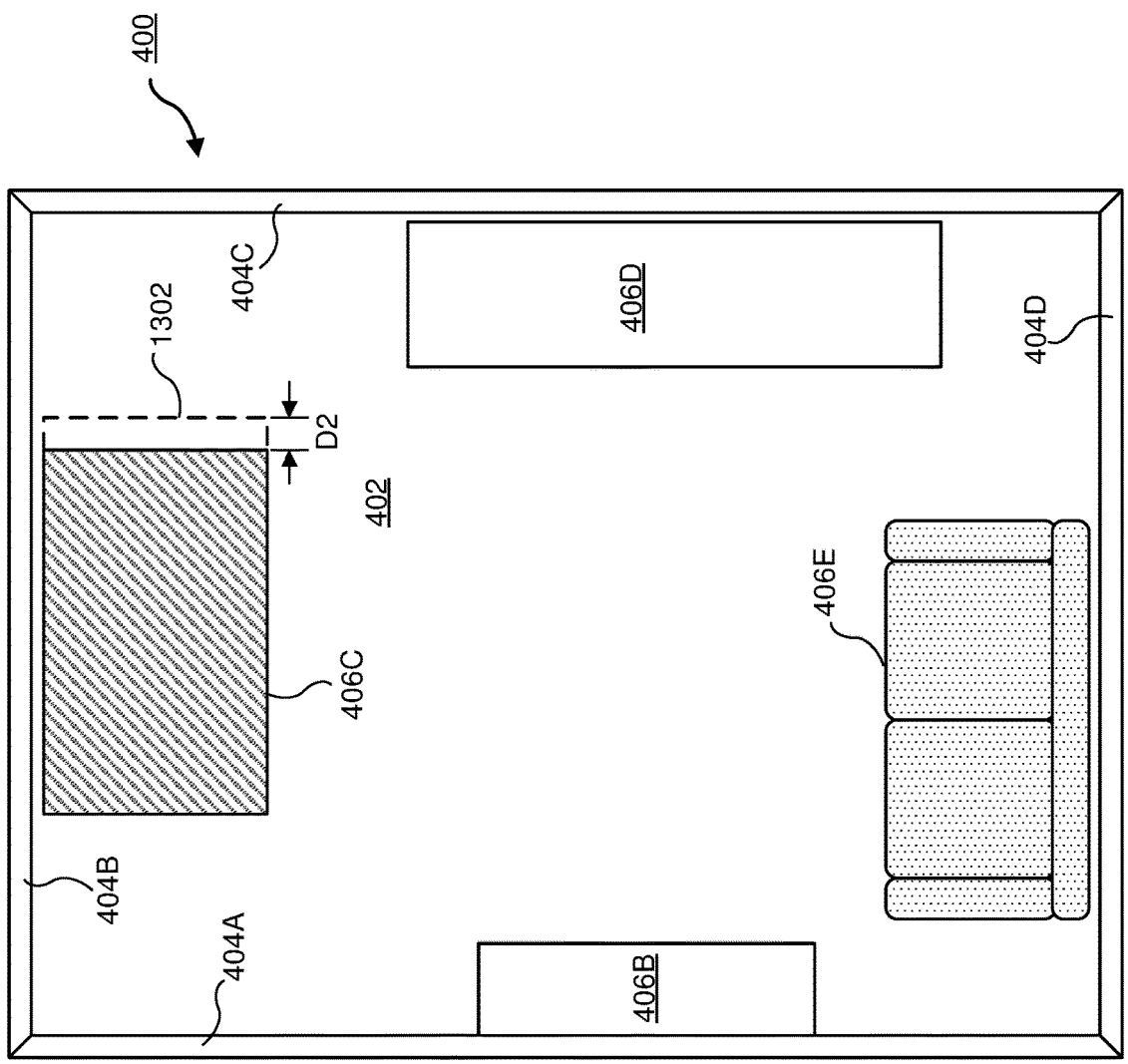
FIG. 13A presents a top view of a real-world environment in which an object has been moved, according to some embodiments.

FIGS. 13A-D illustrate how a user may be made aware of moved objects within the real-world environment, while remaining immersed in the virtual environment, according to some embodiments. FIG. 13A shows a top view of the real-world environment 400 in which at least one object has been moved since the model 500 was initially generated. During an interaction phase, another person in the real-world environment 400 may accidentally or intentionally move the table 406C after the user has put on the HMD device 200. For example, another person may intentionally move an object in an effort to make the environment safer for the user.

Figure 13B:
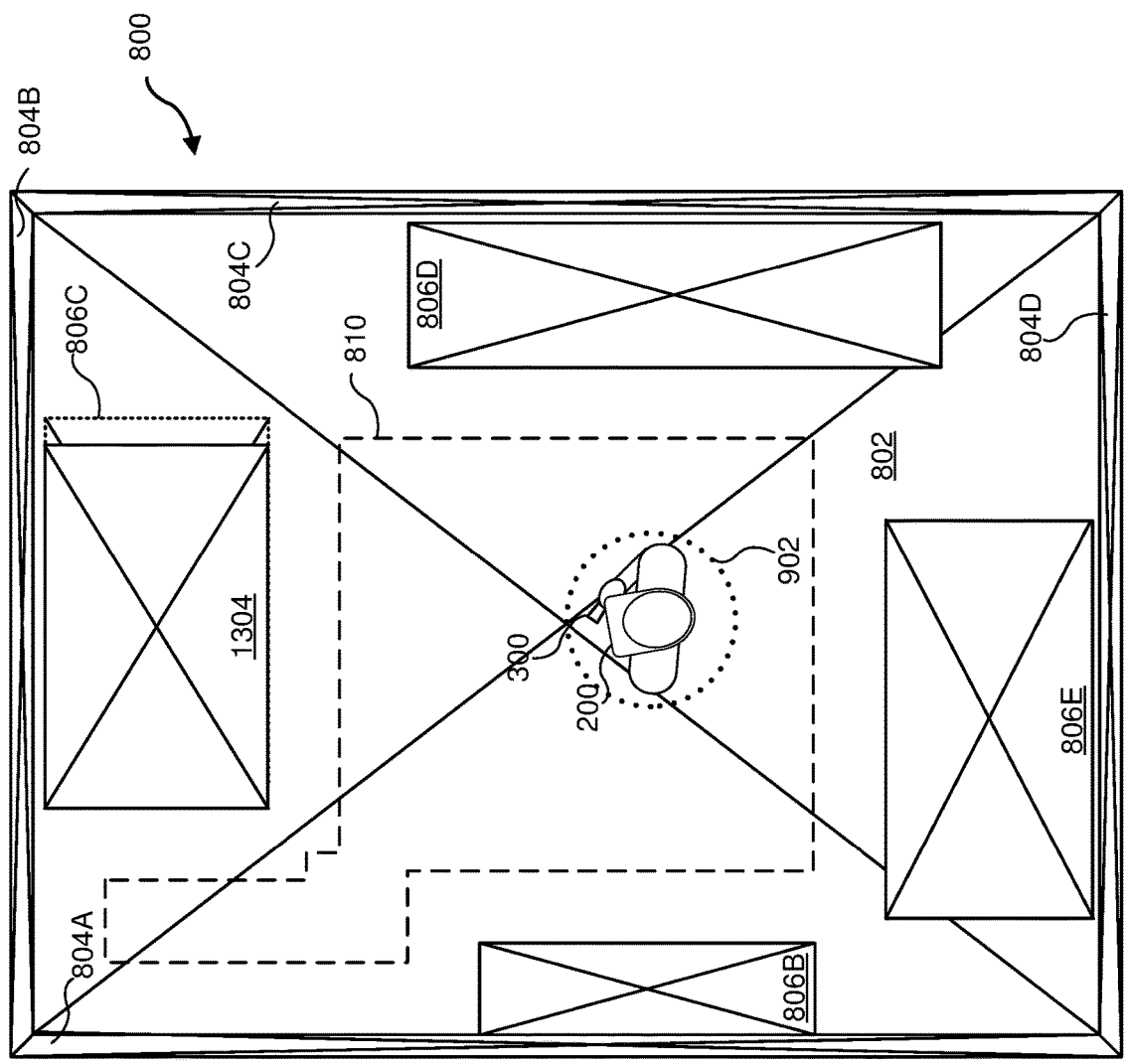
FIG. 13B is a top view of a model of the real-world environment of FIG. 13A, according to some embodiments.

The depth-sensing subsystem 120 and/or the image capture subsystem 130 may continually collect depth information from the real-world environment 400 during the interaction phase. In order to identify changes in the real-world environment 400 that may pose a hazard, the HMD system 100 may perform continuous or periodic comparisons between the most recent depth information and depth information as included in the simplified model 800. Accordingly, the HMD system 100 may detect a change in the position of the table 406C by the displacement D2, relative to an original position shown by the outline 1302. Based on the comparison, the HMD system 100 may alter or update the simplified model 800, as shown in FIG. 13B, so that the simplified modeled table 806C is replaced by a simplified modeled table 1304, representing the table 406C in its new, displaced position. The HMD system 100 may also update the model 500, such that the table 406C is represented by a single model in the new position. This updated model 500 may be stored in a memory device for later use. The user may receive a visual or audio-based notification that the environment 400 has changed and that the model 500 has been updated to reflect the change. In some instances, the HMD system 100 may require an affirmative acknowledgement of the change from the user before resuming the interaction phase. The HMD system 100 may also update the safety boundary 810 to reflect the changed position of the table 406C.

Figure 13C:
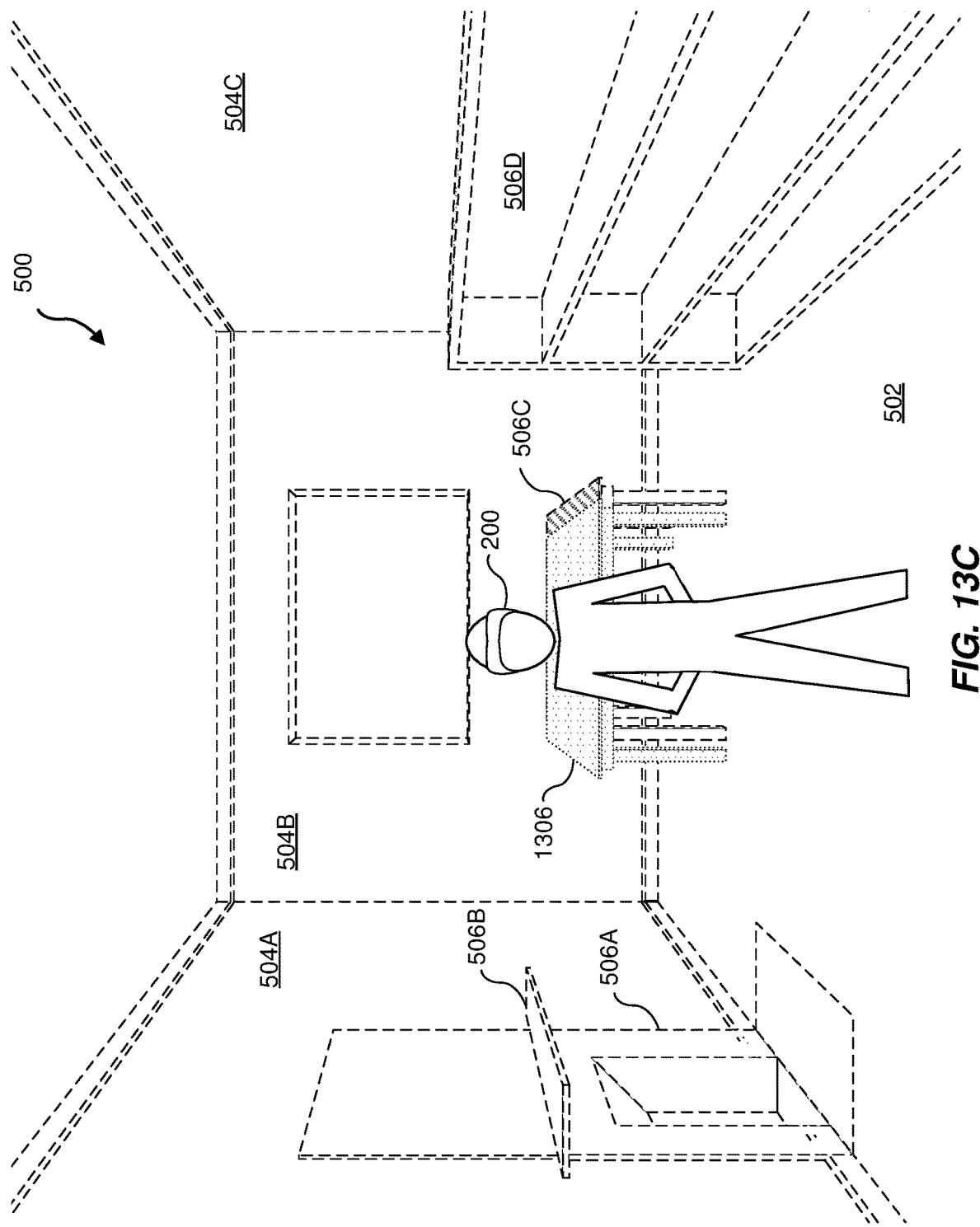
FIG. 13C is a perspective view of a generated model of the real-world environment that shows the moved object, according to some embodiments.

FIG. 13C is a perspective view of a generated model 500 of the real-world environment that shows the moved object, according to some embodiments. The generated model 500 of FIG. 13C may include both the rendered table model 506C and a rendered table model 1306, which represents the table 406C in the displaced position. In some embodiments, the rendered table model 1306 may be displayed in the electronic display 125 with a different color, a different texture, a different opacity, etc., than the table model 506C. This may communicate to the user that the table 406C has changed positions when the user is presented with a view of the table model 506C in response to the user's proximity to the safety boundary 810.

Figure 13D:
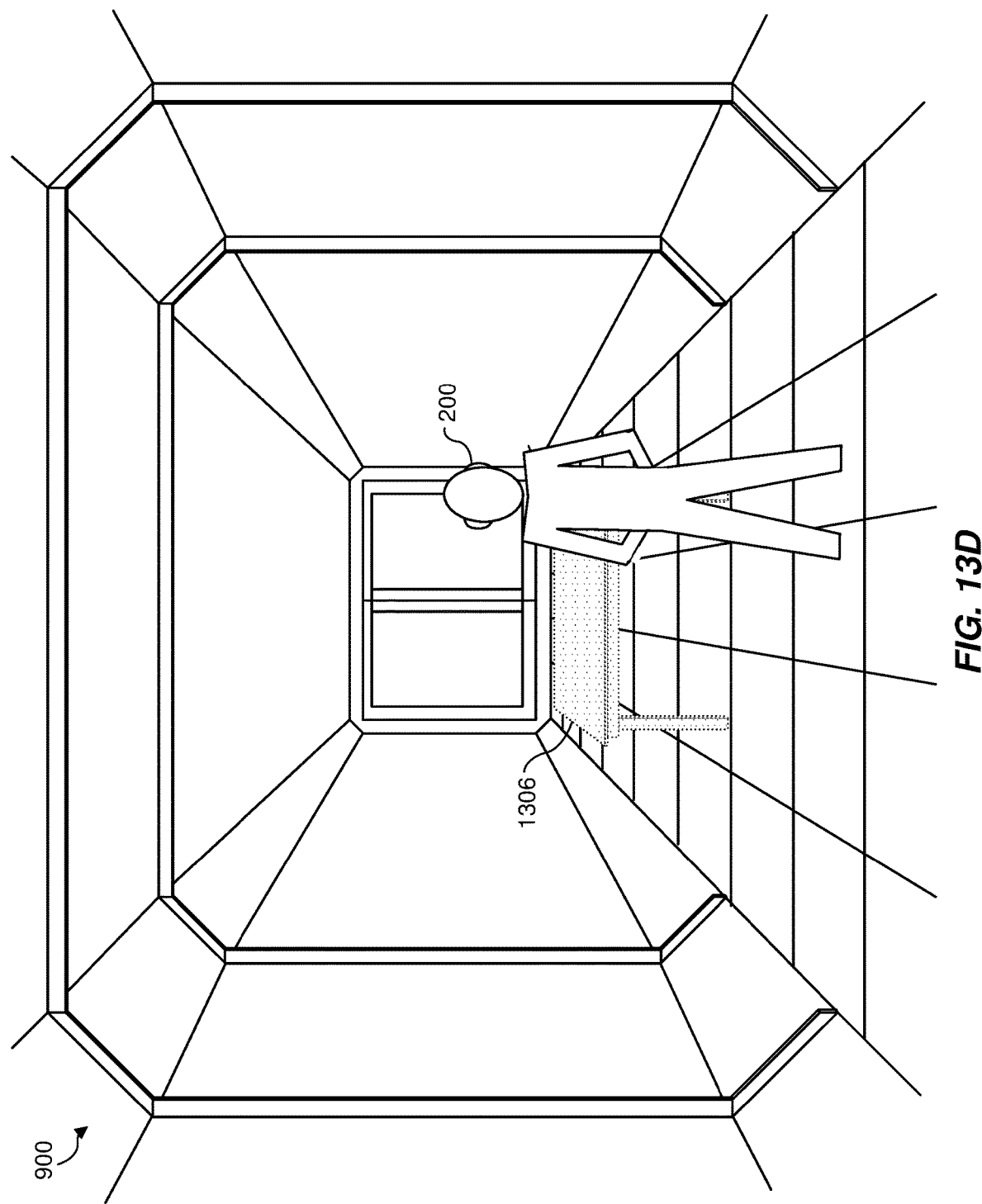
FIG. 13D is a perspective view of a user experiencing a virtual environment with an overlaid model of the moved object of FIG. 13A, according to some embodiments.

As an added measured of safety, the rendered table model 1306 may be presented to the user in the electronic display when the user is viewing the virtual environment 900. FIG. 13D is a perspective view of a user experiencing the virtual environment 900 with a visual overlay of the rendered table model 1306, according to some embodiments. By displaying the rendered table model 1306 over the virtual environment 900, the user may be made aware that the table 406C has been moved, while the user remains engaged with the virtual environment 900. In some embodiments, the activity of the virtual environment 900 may be paused (e.g., game play may be paused) when the displacement D2 is detected by the HMD system 100. The user may interact with a user interface or with the rendered table model 1306 in order to convey the user's acknowledgement of the change in the real-world environment 400. For example, the user may gesture with one or both hands or with the hand-held controller 300 to acknowledge the change in the position of the table 406C as shown by the rendered table model 1306.

In some embodiments, the rendered table 1306 may be automatically overlaid over the virtual environment 900 regardless of the position of the user with respect to the safety boundary 810. In other embodiments, an intermediate boundary may be used to trigger the overlay of the rendered table model 1306 or any other object that the HMD device 100 detects to have moved. For example, where the safety boundary 810 may be set as two feet away from the table 406C (or away from the modeled table 806C), an intermediate boundary may be set approximately three feet to approximately five feet away from the new position of the table 406C (or the table model 1306). Such an approach may inform the user of the change in the position of the table 406C or any other object when the change in the position becomes more pertinent to the user.

Figure 14:
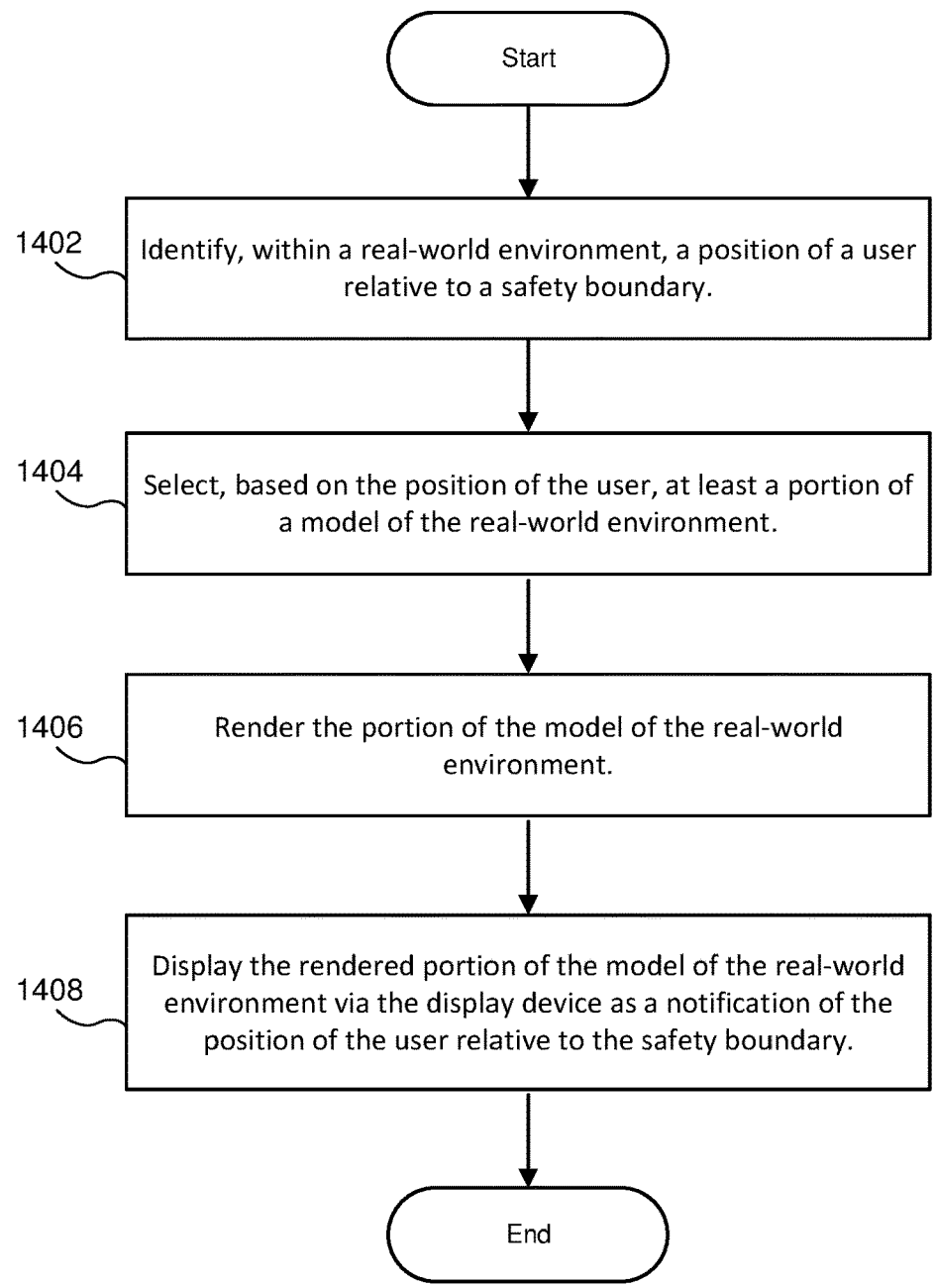
FIG. 14 is a flowchart of a method for providing environmental awareness to a user of a virtual reality system, according to some embodiments.

FIG. 14 is a flowchart of a method 1400 for providing environmental awareness to a user of a VR system, according to some embodiments. As depicted in FIG. 14, the method 1400 includes a series of enumerated operations. Embodiments of the method 1400 may include additional operations before, after, in between, or as part of the enumerated operations. Some embodiments of the method 1400 may be performed by the processing subsystem 110 in connection with other components of the HMD system 100. Additionally, some embodiments of the method 1400 may include a set of instructions, stored on a computer-readable storage medium, that when executed by a processing device, such as the processing subsystem 110, cause the processing device to perform some or all of the operations included in embodiments of the method 1400. In some embodiments, the operations may be performed in a sequence that is different than the sequence depicted in FIG. 14.

Accordingly, some embodiments of the method 1400 may begin at an operation 1402 in which a processing device identifies, within a real-world environment, a position of a user relative to a safety boundary. The position of the user may be identified by an HMD system that includes a display device, which at least partially obscures visibility of the real-world environment to the user. For example, the user may put on the HMD device 200 of FIG. 2 while the user is in the real-world environment 400. The HMD device 200 may include the image capture subsystem 130 and/or the depth-sensing subsystem 120 as described in connection with FIG. 1. Using these subsystems and/or other components, such as the IMU 140 and/or position sensors 135, the HMD device 200 may determine the user's location. In some embodiments, these subsystems may provide captured data to the processing subsystem 110 of the HMD system 100. The HMD system 100 may include the tracking module 155 to track the location of the user. The tracking module 155 may generate the personal zone 902 that may be used as a proxy for the position of the user. The subsystems of the HMD system 100 may further determine the position and orientation of the HMD device 200 so that scenes may be rendered from a perspective corresponding to the HMD device 200.

At an operation 1404, the processing device may select, based on the position of the user, at least a portion of a model of the real-world environment. For example, the processing subsystem 110 may generate a model 500 of the real-world environment 400. At an operation 1406, the processing device may render a portion of the model of the real-world environment. For example, the model 500 may be rendered, from the perspective and orientation of the HMD device 200, so that it provides a view that is similar to a corresponding view of the real-world environment 400. Rendering the model 500 with a similar visual appearance as the real-world environment 400 may help the user to recognize the model 500 as a representation of the user's real-world environment 400.

At an operation 1408, the processing device may display the rendered portion of the model of the real-world environment via the display device as a notification of the position of the user relative to the safety boundary. For example, the user may move within the real-world environment 400 such that the personal zone 902 of the user is within a threshold distance of a safety boundary 810, as shown in FIG. 11B. In response, the HMD device 200 may show a virtual environment 900 along with a window 904 that contains a rendered portion of the model 500. By presenting the rendered portion of the model 500 simultaneously with the virtual environment 900 to the user, the user may be made aware of his or her location with respect to potential hazards within the real-world environment 400 while remaining engaged in the virtual environment 900.

In order to render the portion of the model of the real-world environment based on the visual appearance of the real-world environment, embodiments of the method 1400 may include operations of capturing an image of the real-world environment 400, extracting one or more aspects of the visual appearance of one or more physical surfaces represented in the captured image or images, and applying the aspect or aspects to a corresponding modeled surface or surfaces.

In some embodiments, the safety boundary may be determined as an offset relative to various features of the real-world environment. For example, a simplified model of the real-world environment, such as the model 800 of FIG. 8, may include a modeled sofa 806E. A safety boundary 810 may be automatically defined around the modeled sofa 806E or a predetermined distance from the modeled sofa 806E. In some embodiments, multiple safety boundaries may be generated in such a manner. The user's position may be monitored with respect to each of the safety boundaries, or the multiple safety boundaries may be combined into a single safety boundary associated with the real-world environment 400. The rendered portion of the model 500 shown in the window 904 may be shown based on the user's velocity with respect to a safety boundary in addition to showing the window 904 based on the user's position 7. For example, the window 904 may be displayed when the user is a further distance away from a potential hazard when the user is moving quickly toward the potential hazard. When the processing subsystem 110 determines that the user is moving more slowly, the processing subsystem 110 may provide for a safety boundary with a smaller offset from the potential hazard. In other words, a distance at which a safety boundary is displayed may be dependent on a velocity at which the user is moving.

Some embodiments of the method 1400 may include operations that communicate the presence of a dynamic hazard to the user. Such operations may include capturing real-time depth data within the real-world environment and identifying a physical object, in the real-time depth data, that is positioned within the real-world environment. For example, another person may enter the real-world environment 400 while the user's view is obstructed by the HMD device 200. One or more subsystems of the HMD device 200 may detect the presence of the other person as a dynamic hazard 1200, as shown in FIG. 12B. The processing subsystem 110 may generate a representation of the identified physical object, render that representation, and display the rendered representation of the identified physical object based on the position or perspective of the user. For example, the dynamic hazard 1200 of FIG. 12B may be rendered as the model 1202 shown in FIG. 12A.

In some embodiments of the present disclosure, the generation of the model 500 may be performed during a training phase. Such a training phase may be required by the HMD system 100 whenever the HMD device 200 is to be utilized in a new or unfamiliar environment. During an interaction phase, when the user is engaged with a virtual environment shown in the electronic display and the HMD device 200 detects objects other than those identified in the training phase, the detected objects may be modeled, rendered, and displayed to the user as an indication that the real-world environment contains previously unknown hazards that the user is not aware of because they were not present when the user put on the HMD device 200 to begin a VR session. The objects that are introduced into the environment 400 after the start of an interaction phase in a VR session may be rendered with a lower resolution texture than may be applied to objects modeled during a training phase.

Figure 15:
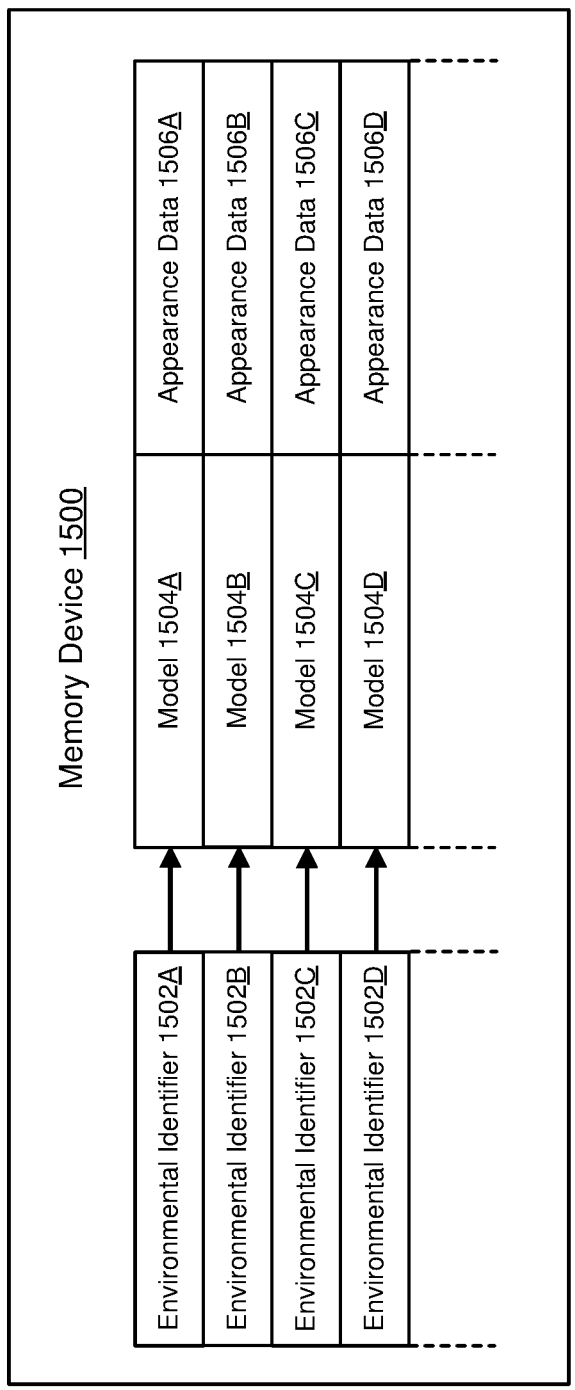
FIG. 15 is a diagram of a memory device containing a set of environmental identifiers that correspond to existing models and appearance data, according to some embodiments.

FIG. 15 is a diagram of a memory device 1500 containing a set of environmental identifiers that correspond to a set of models and appearance data, according to some embodiments. The memory device 1500 may be included in the processing subsystem 110 of the HMD system 100. In order to simplify the use of the HMD system 100, the processing subsystem 110 may generate environmental identifiers 1502, several of which are illustrated in FIG. 15. The environmental identifiers 1502 may be generated based on two-dimensional or three-dimensional information characterizing a real-world environment. For example, an environmental identifier may include one or more two-dimensional images of a user's living room. The user may be prompted during an initiation phase to capture image data from the living room by "looking" around the room while wearing the HMD device 200. The amount of detail captured may be lower than is required during the training phase, so the initiation phase may take less time than the training phase. The images captured during the initiation phase may be compared with images saved as an environmental identifier in the memory device 1500. In other embodiments, two-dimensional images or data maps may be processed to generate an environmental identifier that may require less memory than the two-dimensional images or data maps themselves.

The HMD system 100 may compare the environmental identifier captured during the initiation phase with each of the environmental identifiers 1502. When a match is found, the HMD system 100 may retrieve a corresponding model and appearance data from the memory device 1500. As an example, if the HMD system 100 were to determine that the environmental identifier captured during an initiation phase matches the environmental identifier 1502B, the HMD system 100 may retrieve and use the model 1504B (e.g., model 1504B may be retrieved from a model library including models 1504A, 1504B, 1504C, and 1504D) and the appearance data 1506B because they correspond to the environmental identifier 1502B within memory device 1500. In some embodiments, the memory device 1500 may store rendered models that integrate both a structural model and the associated appearance data already mapped to the structural model.

When the HMD system 100 does not find an environmental identifier that corresponds to the environmental identifier captured during the initiation phase, the HMD system 100 may enter a training phase in which the user is directed to capture information that the HMD system 100 can use to generate a model. This may include two-dimensional and three-dimensional information so that the model can be rendered in three dimensions with aspects of its visual appearance that correspond to the real-world environment, as described herein. Enabling the HMD system 100 to retrieve a stored model may save time for the user, allowing the user to begin an interaction phase of a VR session more quickly.

Embodiments of the present disclosure may provide for systems and methods to make a VR system user aware of his or her surrounding environment, even when the user's view of the environment is partially or completely obstructed by an HMD device. Because the portion of the model of the real-world environment corresponds to the user's actual real-world environment, the user intuitively understands his or her position and movements within the environment. This may be done in a way that minimizes or lessens the user's engagement with the virtual environment. Dynamically arising or changing hazards may also be brought to the user's attention while allowing the user to remain engaged.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In some embodiments, the term "computer-readable storage medium" generally refers to any form of device, carrier, or medium capable of storing or carrying computer-readable instructions. Examples of computer-readable storage media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising: capturing information regarding a real-world environment using a head-mounted display capable of generating a virtual reality environment for a wearer of the display, the real-world environment including one or more objects;
   defining a safety boundary based on the captured information;
   constructing a model of the real-world environment, the safety boundary, and the objects based on the captured information, wherein the model of the real-world environment comprises a three-dimensional mapping of a physical area around the head-mounted display system;
   determining a location of the wearer in the real-world environment using the head-mounted display;
   based on the determined location, determining if the wearer is within a predetermined distance from the safety boundary;
   if the wearer is within the predetermined distance, then retrieving at least a portion of the model of the real-world environment;
   rendering the retrieved portion of the model of the real-world environment; and
   displaying the rendered portion of the model of the real-world environment as part of the virtual reality environment to notify the wearer of their position relative to the safety boundary, wherein the rendered portion includes at least one of the objects in the real-world environment.

2. The method of claim 1, wherein at least a portion of the safety boundary is included in the retrieved portion of the model of the real-world environment.

3. The method of claim 1, wherein rendering the portion of the model of the real-world environment comprises rendering the portion of the model of the real-world environment based on a visual appearance of the real-world environment.

4. The method of claim 3, wherein rendering, based on the visual appearance of the real-world environment, the portion of the model of the real-world environment comprises:
   capturing an image of the real-world environment;
   extracting an aspect of the visual appearance of a physical surface represented in the captured image; and
   applying the aspect to a modeled surface, corresponding to the physical surface, included in the model of the real-world environment, such that the modeled surface is rendered with the aspect of the visual appearance of the physical surface.

5. The method of claim 3, further comprising: generating an environment identifier from information captured from the real-world environment;
   comparing the environment identifier with a plurality of stored environment identifiers to find a matching environment identifier, the matching environment identifier being associated with a matching model of a plurality of models of a model library and a matching visual appearance data set of a plurality of visual appearance data sets; and
   retrieving the matching model for rendering and display in the display device when the comparison results in finding the matching environment identifier; or
   generating a new model when the comparison results in not finding the matching environment identifier.

6. The method of claim 1, further comprising:
   collecting, with a depth-sensing system, depth information associated with physical surfaces within the real-world environment; and
   generating the model of the real-world environment based on the collected depth information, wherein the model of the real-world environment comprises a model of a room where the head-mounted display system is located.

7. The method of claim 1, wherein: determining if the wearer is within the predetermined distance from the safety boundary comprises determining that the wearer is moving toward the safety boundary; and
   displaying the rendered portion of the model of the real-world environment is performed in response to determining that the wearer is moving toward the safety boundary.

8. The method of claim 1, further comprising:
   capturing real-time depth data within the real-world environment;
   identifying a physical object, in the real-time depth data, that is positioned within the real-world environment;
   generating a representation of the identified physical object;
   rendering the representation of the identified physical object; and
   displaying the rendered representation of the identified physical object based on the position of the wearer.

9. The method of claim 1, wherein:
   the model comprises representations of physical surfaces present within the real-world environment during a training phase;
   the method further comprises:
   identifying, during an interaction phase and within the real-world environment, a new physical surface that is not represented in the model; and
   in response to at least one of identifying the new physical surface or identifying the position of the wearer, displaying a representation of the new physical surface as an indication that the new physical surface is present in the real-world environment.

10. The method of claim 9, further comprising rendering the representation of the new physical surface with a lower-resolution texture than is applied to the representations of physical surfaces present within the real-world environment during the training phase.

11. The method of claim 1, further comprising: detecting that the position of the wearer is within a threshold distance of a physical object present in the real-world environment; and in response to the detecting that the position of the wearer is within the threshold distance of the physical object, directing that a rendering of a representation of the physical object be displayed to the wearer via the display device.

12. The method of claim 1, wherein determining if the wearer is within a predetermined distance from the safety boundary comprises:
   determining a location and orientation of the display device relative to the real-world environment;
   defining a personal zone of the wearer, the personal zone surrounding the location of the display device and extending downward to approximate physical dimensions of the use* wearer within the real-world environment; and identifying the position of the personal zone relative to the safety boundary.

13. A non-transitory, tangible computer-readable storage medium having instructions stored thereon that, when executed by a processing system, cause the processing system to perform operations comprising:

capturing information regarding a real-world environment using a head-mounted display capable of generating a virtual reality environment for a wearer of the display, the real-world environment including one or more objects;

defining a safety boundary based on the captured information;

constructing a model of the real-world environment, the safety boundary, and the objects based on the captured information, wherein the model of the real-world environment comprises a three-dimensional mapping of a physical area around the display device;

determining a location of the wearer in the real-world environment using the head-mounted display;

based on the determined location, determining if the wearer is within a predetermined distance from the safety boundary;

if the wearer is within the predetermined distance, then retrieving at least a portion of the model of the real-world environment;

rendering the retrieved portion of the model of the real-world environment; and displaying the rendered portion of the model of the real-world environment as part of the virtual reality environment to notify the wearer of their position relative to the safety boundary, wherein the rendered portion includes at least one of the objects in the real-world environment.

14. The computer-readable storage medium of claim 13, wherein: displaying the rendered portion of the model of the real-world environment to comprises simultaneously displaying a portion of the virtual reality environment and the rendered portion of the model of the real-world environment in the display.

15. The computer-readable storage medium of claim 13, wherein the operations further comprise: generating the model of the real-world environment to include representations of physical surfaces present within the real-world environment during a training phase; identifying, during an interaction phase and within the real-world environment, a new physical surface that is not represented in the model; and in response to at least one of identifying the new physical surface or identifying the position of the wearer, displaying a representation of the new physical surface as an indication that the new physical surface is present in the real-world environment.

16. The computer-readable storage medium of claim 13, wherein determining if the wearer is within the predetermined distance from the safety boundary comprises:

determining a location and orientation of the display device relative to the real-world environment;

determining a location of one or more hand-held controllers; defining a personal zone of the wearer, the personal zone surrounding the location of the display device and the one or more hand-held controllers and extending downward to approximate physical dimensions of the wearer within the real-world environment; and identifying the position of the personal zone relative to the safety boundary.

17. A head-mounted display system comprising: a display device dimensioned to be secured to a head of a user in a manner that at least partially obscures visibility of a real-world environment to the user;

an information capture subsystem that captures information regarding the real-world environment via the head-mounted display, the real-world environment including one or more objects;

a safety boundary subsystem that defines a safety boundary based on the captured information;

a model subsystem that constructs a model of the real-world environment, the safety boundary, and the objects based on the captured information;

a positioning subsystem that determines a position of the user within the real-world environment relative to the safety boundary; and a processing subsystem that: selects, based on the position of the user relative to the safety boundary, a portion of the model of the real-world environment, wherein the model of the real-world environment comprises a three-dimensional mapping of a physical area around the head-mounted display system;

renders the portion of the model of the real-world environment, wherein the rendered portion includes at least one of the objects in the real-world environment; and directs the display device to display the rendered portion of the model of the real-world environment to the user as a notification of the position of the user relative to the safety boundary.

18. The head-mounted display system of claim 17, wherein the positioning subsystem comprises the modeling subsystem and the safety boundary subsystem.

19. The head-mounted display system of claim 17, wherein the display device is configured to fully obscure visibility of the real-world environment to the user.

20. The head-mounted display system of claim 17, further comprising a hand-secured controller; and wherein:

the positioning subsystem detects the position of the user by determining a position of the hand-secured controller; and the processing subsystem: selects, based on the position of the hand-secured controller in relation to the safety boundary, the portion of the model of the real-world environment; and directs the display device to display the rendered portion of the model of the real-world environment to the user as a notification of the position of the hand-secured controller relative to the safety boundary.

* * * * *